US009145037B2

(12) United States Patent
Hawksworth et al.

(10) Patent No.: US 9,145,037 B2
(45) Date of Patent: Sep. 29, 2015

(54) REMOTELY ADJUSTABLE SUSPENSION COUPLING

(71) Applicant: Skinz Protective Gear, Paynesville, MN (US)

(72) Inventors: Jake Hawksworth, Paynesville, MN (US); Jeff Hawksworth, Paynesville, MN (US)

(73) Assignee: Skinz Protective Gear, Paynesville, MN (US)

( * ) Notice: Subject to any disclaimer, the term of this patent is extended or adjusted under 35 U.S.C. 154(b) by 0 days.

(21) Appl. No.: 14/292,134

(22) Filed: May 30, 2014

(65) Prior Publication Data

US 2014/0353933 A1 Dec. 4, 2014

Related U.S. Application Data

(60) Provisional application No. 61/829,418, filed on May 31, 2013, provisional application No. 61/841,160, filed on Jun. 28, 2013.

(51) Int. Cl.
*B62M 27/02* (2006.01)
*B60G 17/027* (2006.01)

(52) U.S. Cl.
CPC ........... *B60G 17/0272* (2013.01); *B62M 27/02* (2013.01); *B60G 2300/322* (2013.01); *B62M 2027/026* (2013.01)

(58) Field of Classification Search
CPC ..................... B60G 17/0272; B60G 2300/322; B62M 2027/026
USPC ........ 180/9.1, 9.25, 9.28, 9.3, 9.5, 9.52, 9.54, 180/9.56, 9.64, 182, 184, 186, 190, 193
See application file for complete search history.

(56) References Cited

U.S. PATENT DOCUMENTS 4,987,965 A * 1/1991 Bourret .......................... 180/193
5,370,198 A * 12/1994 Karpik .......................... 180/193

(Continued)

FOREIGN PATENT DOCUMENTS

WO WO-2009067716 A1 5/2009
WO WO-2010082978 A2 7/2010

(Continued)

OTHER PUBLICATIONS

International Search Report from PCT application PCT/US/2014/040336, dated Oct. 15, 2014, 9 pages.

*Primary Examiner* — Paul N Dickson
*Assistant Examiner* — Darlene P Condra
(74) *Attorney, Agent, or Firm* — Craige Thompson; Thompson Patent Law

(57) ABSTRACT

Apparatus and associated methods relate to displacement-independent remote adjustable coupling of a first suspension member to a second suspension member. In an illustrative embodiment, the first suspension member may move substantially independently of any motion of the second suspension member, when in an uncoupled state. When in a coupled state, for example, the first suspension member may move in response to movement of the second suspension member. In some embodiments, the coupling between members may be performed by removing and/or stiffening one or more degrees of motion of the suspension system. For example, in some systems, a variable shock absorber may be stiffened in response to a control system signal. A remotely coupled suspension system may advantageously provide optimal suspension configuration for various riding conditions.

20 Claims, 19 Drawing Sheets

(56) References Cited

U.S. PATENT DOCUMENTS

| | | | |
|---|---|---|---|
| 5,692,579 A * | 12/1997 | Peppel et al. | 180/190 |
| 6,032,752 A | 3/2000 | Karpik et al. | |
| 6,206,124 B1 * | 3/2001 | Mallette et al. | 180/193 |
| 6,467,561 B1 | 10/2002 | Boivin et al. | |
| 6,478,098 B2 | 11/2002 | Boivin et al. | |
| 6,715,575 B2 * | 4/2004 | Karpik | 180/193 |
| 6,976,689 B2 | 12/2005 | Hibbert | |
| 6,991,057 B2 | 1/2006 | Imamura et al. | |
| 7,040,438 B2 | 5/2006 | Yshihara | |
| 7,070,012 B2 * | 7/2006 | Fecteau | 180/9.5 |
| 7,322,435 B2 | 1/2008 | Lillbacka et al. | |
| 7,350,787 B2 | 4/2008 | Voss | |
| 7,360,618 B2 | 4/2008 | Hibbert et al. | |
| 7,395,890 B2 | 7/2008 | Visscher | |
| 7,533,750 B2 | 5/2009 | Simmons et al. | |
| 7,594,557 B2 | 9/2009 | Polakowski et al. | |
| 7,694,768 B2 * | 4/2010 | Giese et al. | 180/190 |
| 7,854,285 B1 * | 12/2010 | Giese | 180/193 |
| 7,891,454 B2 | 2/2011 | Giese et al. | |
| 7,975,794 B2 * | 7/2011 | Simmons | 180/193 |
| 8,002,301 B2 | 8/2011 | Weagle | |
| 8,151,923 B1 | 4/2012 | Giese | |
| 8,167,073 B2 | 5/2012 | Polakowski et al. | |
| 8,214,106 B2 | 7/2012 | Ghoneim et al. | |
| 8,458,080 B2 | 6/2013 | Shirai | |
| 8,499,877 B1 | 8/2013 | Giese | |
| 8,517,136 B2 | 8/2013 | Hurd et al. | |
| 8,522,911 B2 | 9/2013 | Hurd et al. | |
| 8,567,546 B2 | 10/2013 | Berg et al. | |
| 8,573,605 B2 | 11/2013 | Di Maria | |
| 8,607,912 B2 | 12/2013 | Mallette et al. | |
| 8,655,548 B2 | 2/2014 | Ichida et al. | |
| 2002/0060102 A1 | 5/2002 | Boivin et al. | |
| 2004/0090020 A1 | 5/2004 | Braswell | |
| 2005/0016784 A1 | 1/2005 | Fecteau | |
| 2006/0185919 A1 * | 8/2006 | Hibbert et al. | 180/190 |
| 2007/0199753 A1 | 8/2007 | Giese et al. | |
| 2007/0221424 A1 | 9/2007 | Giese | |
| 2007/0246283 A1 | 10/2007 | Giese et al. | |
| 2009/0242339 A1 | 10/2009 | Nakadate et al. | |
| 2009/0321167 A1 | 12/2009 | Simmons | |
| 2010/0071982 A1 * | 3/2010 | Giese et al. | 180/193 |
| 2011/0186371 A1 | 8/2011 | Berg et al. | |
| 2011/0240394 A1 | 10/2011 | Hurd et al. | |
| 2011/0240395 A1 | 10/2011 | Hurd et al. | |
| 2012/0166043 A1 | 6/2012 | Watson | |
| 2012/0193158 A1 | 8/2012 | Giese | |
| 2013/0032417 A1 | 2/2013 | Sampson | |
| 2013/0032418 A1 | 2/2013 | Ripley et al. | |
| 2013/0032419 A1 | 2/2013 | Conn et al. | |
| 2013/0032420 A1 | 2/2013 | Mills et al. | |
| 2013/0193676 A1 | 8/2013 | Mertens et al. | |
| 2013/0206494 A1 | 8/2013 | Hedlund et al. | |

FOREIGN PATENT DOCUMENTS

| | | |
|---|---|---|
| WO | WO-2012142497 A1 | 10/2012 |
| WO | WO-2013115922 A1 | 8/2013 |

* cited by examiner

REMOTELY ADJUSTABLE SUSPENSION COUPLING

CROSS-REFERENCE TO RELATED APPLICATIONS

This application claims the benefit of U.S. Provisional Application Ser. No. 61/829,418, titled "Remotely Adjustable Suspension Coupling," filed by Jake Hawksworth et al., on May 31, 2013, and U.S. Provisional Application Ser. No. 61/841,160, titled "Remotely Adjustable Suspension Coupling," filed by Jake Hawksworth et al., on Jun. 28, 2013. The entirety of each of the foregoing applications is hereby incorporated by reference.

TECHNICAL FIELD

Various embodiments relate generally to snowmobile suspensions.

BACKGROUND

Multi-member suspensions may be used in many different types of vehicles. Automobiles may have sophisticated suspensions with each wheel having some independence from the other wheels. ATV vehicles and snowmobiles may have multi-member suspensions as well. Each manufacturer of ATVs or snowmobiles may offer different models for different users and different terrains. Some of these suspensions may be well suited for a certain style of riding or for a certain type of terrain. Some suspensions may provide optimal handling for a certain condition. And some of these suspensions may be designed to provide comfort for the rider.

Snowmobiles are recreational vehicles that may operate on off-road terrains. The off-road terrains may be rugged at times. Some snowmobile riders may enjoy the excitement of riding aggressively in difficult conditions. Some riders may ride snowmobiles up mountain inclines, for example. Some riders may laterally traverse an inclined slope. Some riders may ride over bumpy terrain. Some riders may prefer riding on the plains or over substantially flat fields. Different terrains may present different forces to a snowmobile suspension.

SUMMARY

Apparatus and associated methods relate to displacement-independent remote adjustable coupling of a first suspension member to a second suspension member. In an illustrative embodiment, the first suspension member may move substantially independently of any motion of the second suspension member, when in an uncoupled state. When in a coupled state, for example, the first suspension member may move in response to movement of the second suspension member. In some embodiments, the coupling between members may be performed by removing and/or stiffening one or more degrees of motion of the suspension system. For example, in some systems, a variable shock absorber may be stiffened in response to a control system signal. A remotely coupled suspension system may advantageously provide optimal suspension configuration for various riding conditions.

Apparatus and associated methods may relate to a remotely coupleable snowmobile suspension having a first suspension system permitting a one-dimensional path of relative movement and a second suspension system permitting two-dimensional relative movement, and a remote coupler that adjustably limits the two-dimensional relative movement to a preferred one-dimensional path. In an Illustrative embodiment, the two dimensional relative movement is in a plane substantially parallel to a plane of substantial mirror symmetry of the vehicle. In some embodiments the one-dimensional path of relative movement lies within a plane that is substantially parallel to the plane of substantial mirror symmetry. In some examples, a fixed distance between two coupling members may establish allowable movements along the one-dimensional path of relative movement when in the remote coupler limits the two-dimensional relative movement to the one-dimensional preferred path. When limited to the one-dimensional preferred path, the two suspension systems may both advantageously react to a force acted upon one of two suspension systems.

Apparatus and associated methods may relate to continuously-adjustable remote coupling ratio of a first suspension member to a second suspension member. In an illustrative example, the first suspension member be continuously adjustable from being substantially uncoupled from a second suspension member to being substantially coupled to the second suspension member. In an illustrative embodiment, the first suspension member may be variably coupled to the second suspension member via a remote coupling device. In some embodiments, a suspension controller may send control signals indicative of a coupling level between the first and second suspension members. The suspension controller may receive inputs indicative of metrics of a vehicle of which the suspension members support. In some embodiments, the suspension controller may calculate a coupling coefficient based upon the received inputs. In an exemplary embodiment, the calculated coupling coefficient may provide an increased resistance to rear weight transfer when the vehicle accelerates.

Apparatus and associated methods may relate to a coupling control system that outputs, to one or more actuators, suspension control signals in response to inputs received from vehicle orientation and/or movement transducers. In an illustrative example, the outputs of the coupling control system may be calculated using one or more user preference parameters. The user preference parameters may be used to calculate a level of coupling between a first suspension member and a second suspension member based upon inputs from a user. A user may select from one or more different sets of user preferences to be used by the coupling control system. The outputs of the coupling control system may be based upon a computation using both the user preferences and inputs received from sensor signals coupled to the vehicle. The user may customize a vehicle suspension system to advantageously provide a desired response to forces resulting from vehicle operation.

Apparatus and associated methods may relate to an APP that receives, from a cloud based service, coupling/condition profiles and transmits, to a coupling control system, coupling/condition profiles for use in automatically adjusting a suspension system, in response to vehicle telemetry. In an illustrative example, the APP may receive signals indicative of coupling/condition profiles from a cloud based profile management service. The APP may send signals indicative of the associated profiles to a display device. The APP may receive signals indicative of user selection of one or more profile. The APP may receive signals indicative of suspension controllers and specific vehicles to which they are attached. The APP may present signals indicative of the specific vehicles to a display device. The APP may receive signals indicative of a user's vehicle selection. The APP may send the selected profile to the suspension controller corresponding to the selected specific vehicle.

Various embodiments may achieve one or more advantages. For example, some embodiments may permit the rider to change the suspension behavior in response to a change in the snowmobile terrain. For example, the rider may desire an uncoupled suspension when traveling across a bumpy but otherwise level terrain. In some embodiments, the rider may then change the suspension to a coupled suspension when he turns to go up-hill, so as not to over-compress the rear shock and risk flipping the snowmobile backwards. In various embodiments, the ability to dynamically change the coupling may increase the rider's safety. In some embodiments, the dynamically adjustable coupling may permit the rider to ride more aggressively in a multiplicity of terrains. In one embodiment, for example, an attitude sensor may automatically adjust the coupling to provide a safe suspension mode for the snowmobiles pitch. In some embodiments, the rider may have personal favorite coupling modes that he may pre-program and then select when he so desires. In some embodiments, the suspension may become very stiff when coupled strongly, and yet may remain very soft when uncoupled.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, with reference to FIG. 1, Remotely Adjustable Suspension Coupling (RASC) will be introduced via a mountain ride scenario. Second, with reference to FIGS. 2A-2B exemplary components of an exemplary RASC system will be described. Then, the movement range of a snowmobile chassis will be described, with reference to FIGS. 3A-5. Specifically, the movable domain of a chassis as facilitated by the suspension system described in FIGS. 2A-3B will be detailed. Then, with reference to FIG. 6 the movement of a chassis will be described for a chassis using an RASC system in a coupled state. Then various embodiments of RASC systems will be described, with reference to FIGS. 7-10. Then, a block diagram of an automatic controller of an RASC system will be described, with reference to FIG. 11. The automatic controller may use a pre-programmed profile to determine the coupling state based upon various input parameters. Then, with reference to FIGS. 12-13, an exemplary control system methods will be detailed. Finally, with reference to FIGS. 14A-16 an exemplary four and five bar linkage systems. Such linkages systems may be used to describe exemplary coupleable suspension systems.

Figure 1:
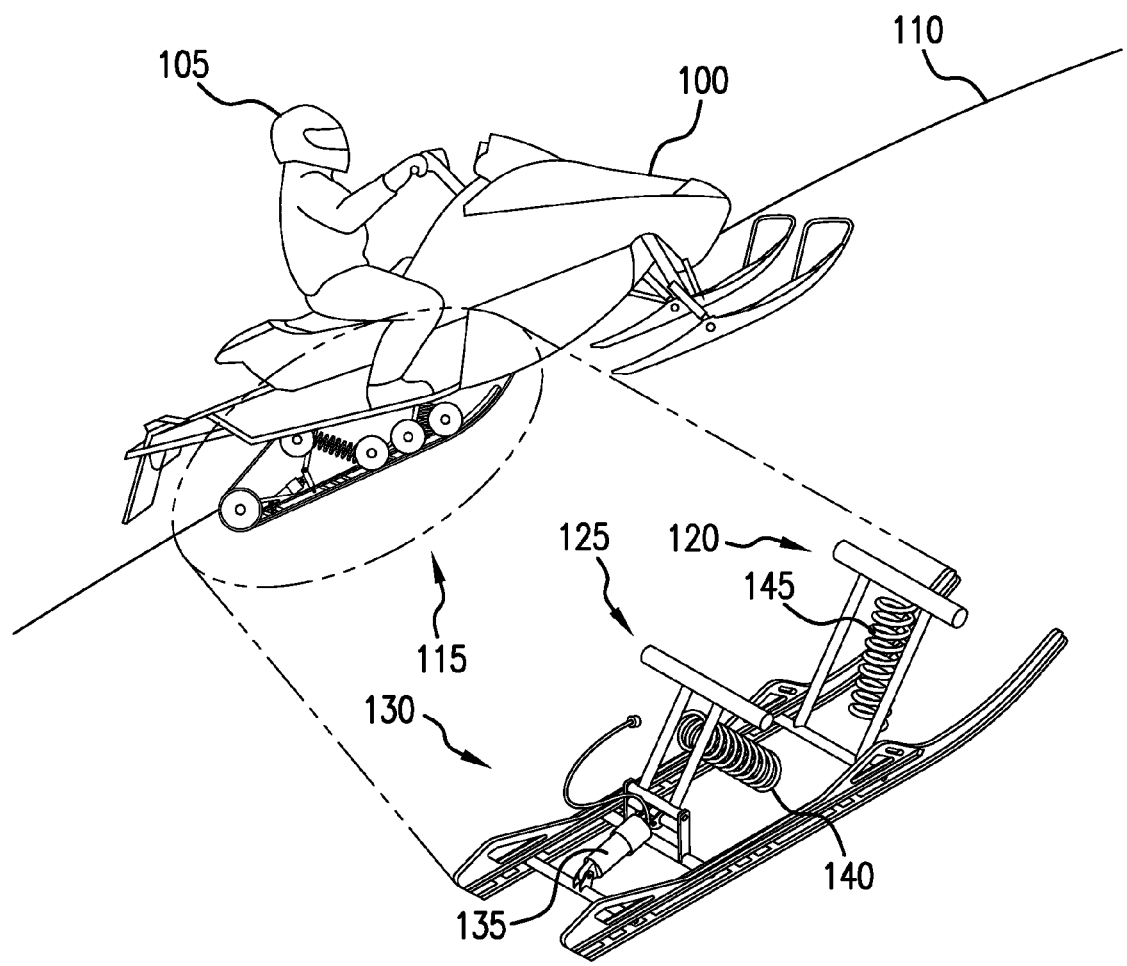
FIG. 1 depicts a field application of a snowmobile using an exemplary Remotely Adjustable Suspension Coupling (RASC).

FIG. 1 depicts a field application of a snowmobile using an exemplary Remotely Adjustable Suspension Coupling (RASC). In FIG. 1, a snowmobile 100 is being driven by a rider 105 up the face of a mountain 110. The snowmobile has a track assembly 115 that has two suspension members 120, 125. When driving up the mountain 110, a weight of the snowmobile 100 may be transferred to the rear suspension member 125 of a track assembly 115. When the weight transfers to the rear suspension member 125 of the track suspension 115, the rear suspension member 125 may compress. This compression of the rear suspension member 125 may further incline the snowmobile 100, which then may be at risk of flipping over backwards and injuring the rider 105. The depicted snowmobile 100 has been equipped with an exemplary Remote Adjustable Suspension Coupling (RASC) 130, which may advantageously reduce this risk. The exemplary RASC 130 has a variable coupling member 135 which may control the amount of coupling of a rear suspension member 125 to the front suspension member 120. The rear suspension member 125 may include a rear shock 140, and the front suspension member 120 may include a center shock 145. When the two suspension members 120, 125 are not coupled, the rear shock 140 may be compressed independently of compression of the center shock 145, for example. But when the two suspension members 120, 125 are coupled, a compression force on a rear shock 140 may cause a compression of the center shock 145. In other words, a compressive force on the rear shock 140 may be coupled or transferred to the center shock 145 as well. In this way, a compressive force on the rear portion of the snowmobile track assembly 115 may be counteracted by both rear and center shocks 140, 145, when the two suspension members are coupled. A counter force (e.g. a spring force) of both shocks 140, 145 combined may provide more counter force than that of the rear shock 140 alone (e.g. when the two suspension members are uncoupled). Because the counter force is greater when the suspension members are coupled, the compression of the rear shock 140 may be advantageously reduced during an up-hill climb.

Figure 2A:
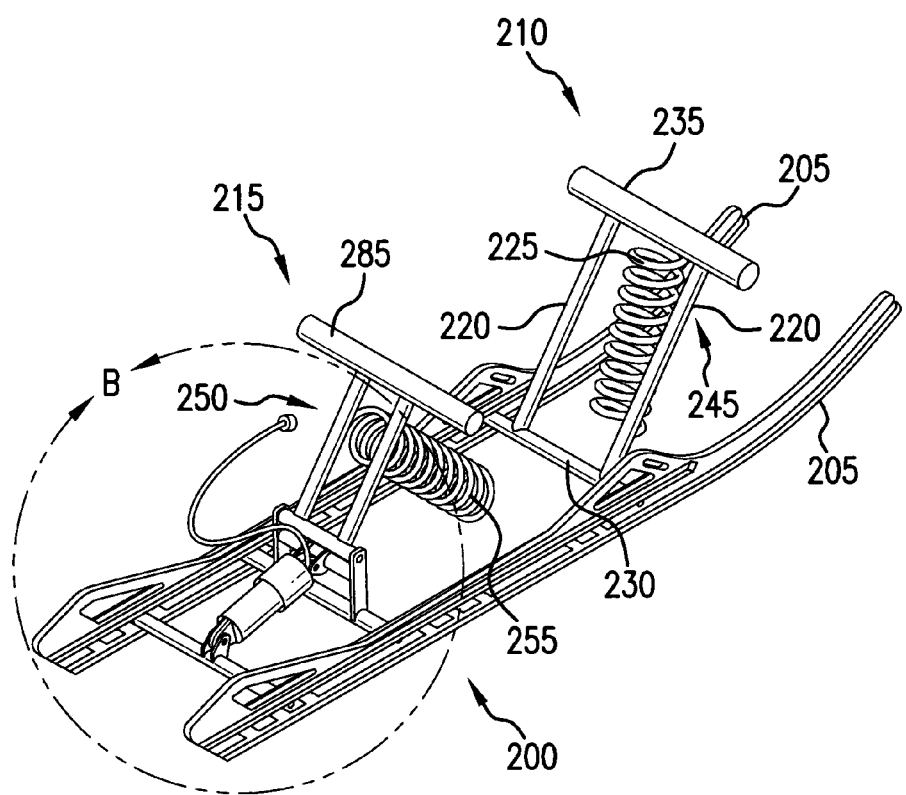
FIGS. 2A-2B depict perspective views of an exemplary RASC.
Figure 2B:
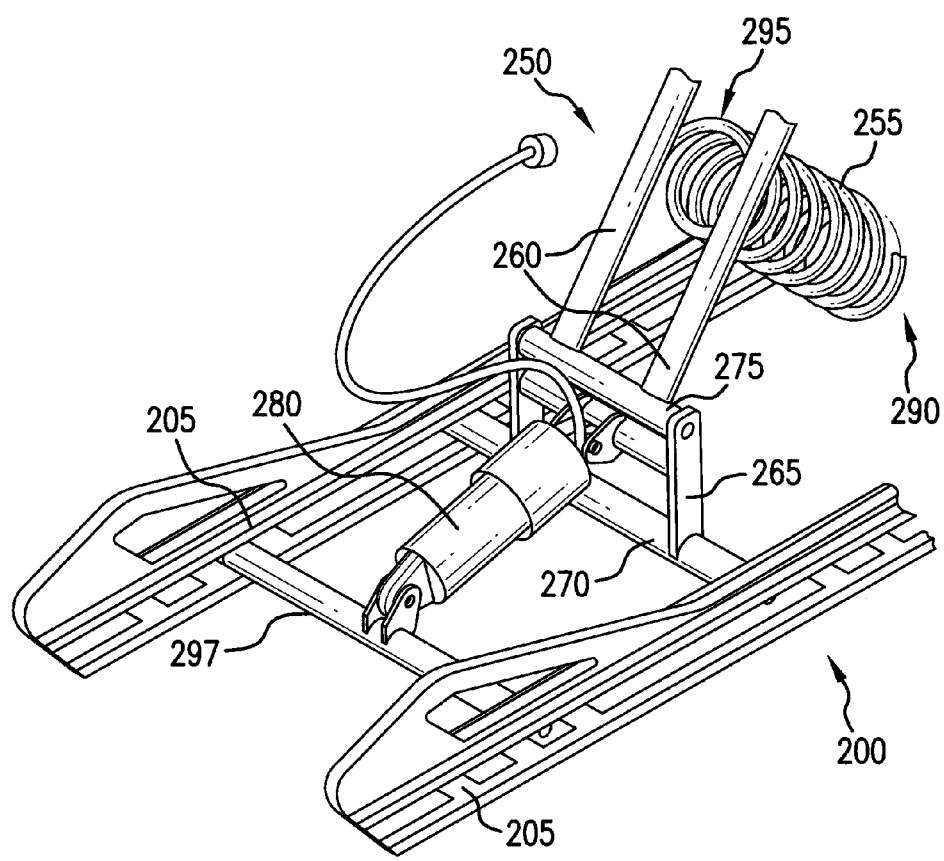

FIGS. 2A-2B depict perspective views of an exemplary RASC. In FIGS. 2A-2B, a snowmobile track assembly 200 includes slide rails 205, a front suspension system 210 and a rear suspension system 215. The front suspension system 210 includes a front mechanism and a front support member. In the depicted embodiment, the front mechanism is depicted as a front torque arm 220, and will be referred to as such hereafter with reference to FIGS. 2A-2B. In the depicted embodiment, the front support member is depicted as a front shock assembly 225, and will be referred to as such hereafter with reference to FIGS. 2A-2B.

The front torque arm 220 pivotably connects to the slide rails 205 via a proximal lateral member 230. A distal lateral member 235 is configured to couple to the snowmobile tunnel (not depicted). The front torque arm 220 may pivot about the proximal lateral member 230 in response to forces presented as a result of snowmobile operation. For example, as the snowmobile traverses uneven terrain, a snowmobile chassis may move relative to the slide rails 205. The relative movement of the snowmobile chassis may be determined at least in part by the arrangement of the various components of the snowmobile track assembly 200.

The front shock assembly 225 may couple to the slide rails 205 at a proximal end 240 in some embodiments. In an exemplary embodiment, the front shock assembly 225 may couple to the slide rails 205 via the proximal lateral member 230, for example. The front shock assembly 225 may connect to the front torque arm 220, or to the distal lateral member 235, at a distal end 245. In some embodiments, the front shock assembly 225 may connect to the snowmobile tunnel at the distal end 245. The front shock assembly 225 may provide support of a snowmobile chassis above the slide rails 205, for example.

The front shock assembly 225 may include a shock absorber and/or a spring. Various types of shock absorbers may be included in a front shock assembly 225. Various types of springs may be included in a front shock assembly 225. In an exemplary embodiment, the front shock assembly 225 may include a hydraulic shock absorber and a coil spring, for example. In some embodiments, a front shock assembly may include a gas charged shock. In some examples, a torsion spring may be included in a front shock assembly 225. The front shock assembly 225 may have a shock length defined between an upper connection point and a lower connection point. For example, a lower connection point may be the point where an exemplary front shock assembly 225 connects to the slide rails 205. An upper connection point may be the point where an exemplary front shock assembly 225 connects to the front torque arm 220 in such systems, for example. The shock length may be defined as the distance between these two connection points: the upper connection point and the lower connection point, for example.

The shock length may vary in response to loading conditions of the snowmobile. When a snowmobile encounters rugged terrain, for example, the shocks may dynamically change (e.g. expand and/or contract) in response to encounters with changing terrain topographies. Weight transfer can occur due to a rider changing position. Weight transfer can occur in response to snowmobile acceleration, for example. A snowmobile may change attitude as it encounters hills, and weight transfer may result from such attitude changes. Weight transfer may cause the shocks to dynamically change as well. When the shocks change the shock length may change. The shock length may have a maximum length and/or a minimum length beyond which, the front shock assembly 225 may be unable to further expand or contract. The maximum length and the minimum length of a front shock assembly 225 may limit a pivotable range of the front torque arm 220 about the proximal lateral member 235 in response forces resulting from snowmobile operation.

The rear suspension system 215 includes a rear mechanism and a rear support member 255. In the depicted embodiment, the rear mechanism includes a rear torque arm 260, and a rear scissors member 265. In the depicted embodiment, the rear support member is depicted as a rear shock assembly 255, and will be referred to as such hereafter with reference to FIGS. 2A-2B.

The scissors member 265 pivotably connects to the slide rails 205 via a proximal lateral member 270. A distal lateral member 275 is configured to pivotably couple to the rear torque arm 260. The distal lateral member 275 may pivot about the proximal lateral member 270 in response to forces resulting from snowmobile operation. A remote coupling member 280 may couple between the scissors member 265 and an aft lateral member 297 attached at each end to one of the parallel rails 205. In the depicted embodiment, the remote coupling member 280 is depicted as a remotely adjustable shock absorber 280, and will be referred to as such hereafter with reference to FIGS. 2A-2B. The remotely adjustable shock absorber 280 may have a length that may change in response to forces applied thereto. The remotely adjustable shock 280 absorber may present a resistance to such applied forces. In some embodiments, the remotely adjustable shock 280 may be remotely adjusted to present a relatively high resistance to length-changing forces, for example. The remotely adjustable shock 280 may be remotely adjusted to present a relatively low resistance to length-changing forces, for example. In some embodiments, the remotely adjustable shock 280 may be remotely adjusted to present a continuum of resistances between the relatively high resistance and the relatively low resistance to length-changing forces.

The remotely adjustable shock 280 may have a maximum length and a minimum length beyond which the shock cannot further expand or contract. These maximum and minimum lengths may limit the pivotable range that the distal lateral member 275 may pivot about the proximal lateral member 270.

The rear torque arm 260 is pivotably connected to the scissors member 265 via the distal lateral member 275 of the scissors member 265. The torque arm 260 has a distal lateral member 285 which may be configured to couple to the snowmobile tunnel (not depicted). The rear torque arm 260 may pivot about the distal lateral member 275 in response to forces presented as a result of snowmobile operation.

The rear shock assembly 255 may couple to the slide rails 205 at a proximal end 290 in some embodiments. The rear shock assembly 255 may connect to the rear torque arm 260 at a distal end 295. In some embodiments, the rear shock assembly 255 may connect to the snowmobile tunnel at the distal end 295. The rear shock assembly 255 may provide support of a snowmobile chassis above the slide rails 205, for example.

The rear shock assembly 255 may include a shock absorber and/or a spring. Various types of shock absorbers may be included in a rear shock assembly 255. Various types of springs may be included in a rear shock assembly 255. In an exemplary embodiment, the rear shock assembly may include a hydraulic shock absorber and a coil spring, for example. In some embodiments, a rear shock assembly 255 may include a gas charged shock. In some examples, a torsion spring may be included in a rear shock assembly 255. The rear shock assembly 255 may have a shock length defined between an upper connection point and a lower connection point. For example, a lower connection point may be the point where an exemplary rear shock assembly 255 connects to the slide rails 205. An upper connection point may be the point where an exemplary rear shock assembly 255 connects to the rear torque arm 260 in such systems, for example.

The shock length may be defined as the distance between these two connection points: the upper connection point and the lower connection point, for example. The shock length may have a maximum length and/or a minimum length beyond which, the rear shock assembly 255 may be unable to further expand or contract. The maximum length and the minimum length of a rear shock assembly 255 may limit a range of movement of the rear torque arm 260.

Figure 3A:
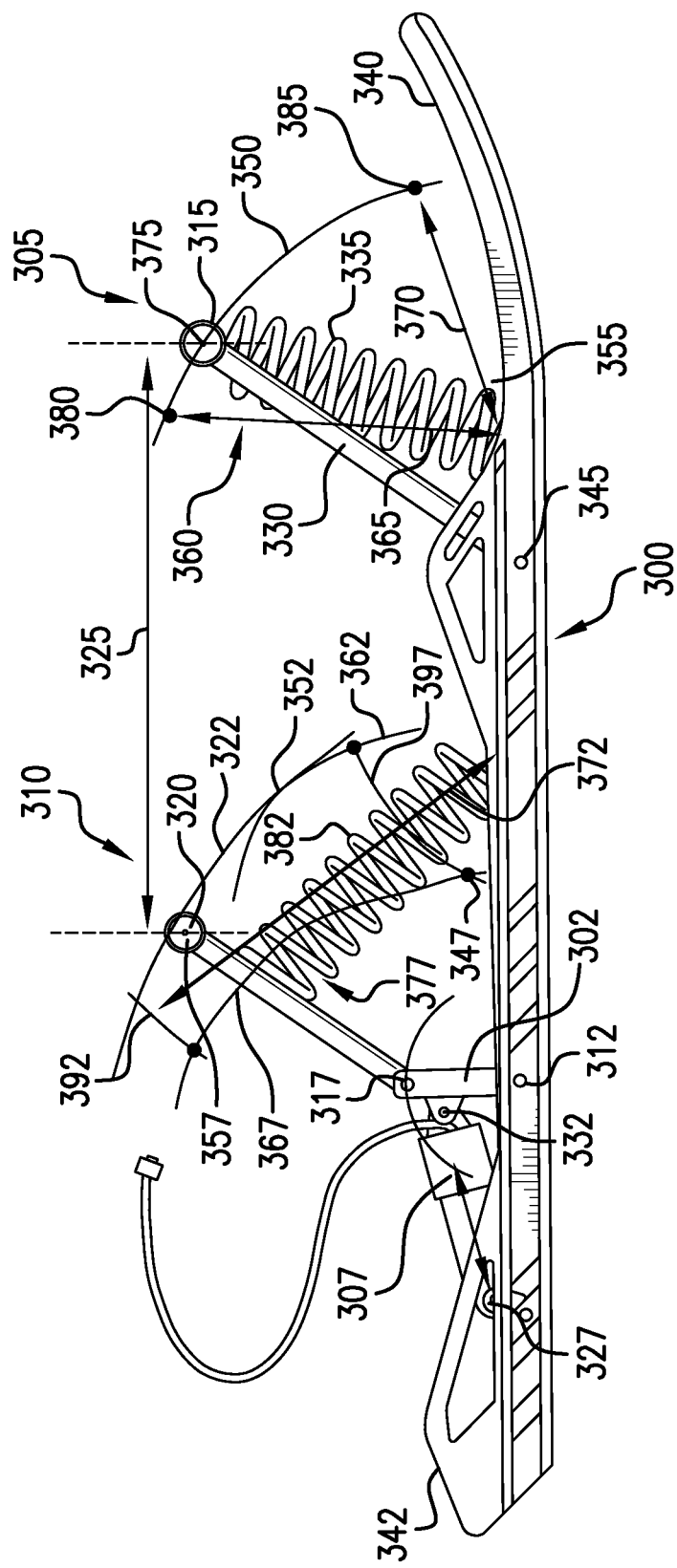
FIGS. 3A-3B depict a side elevation view of an exemplary RASC system along with ranges of positions for a snowmobile tunnel's pivot points.
Figure 3B:
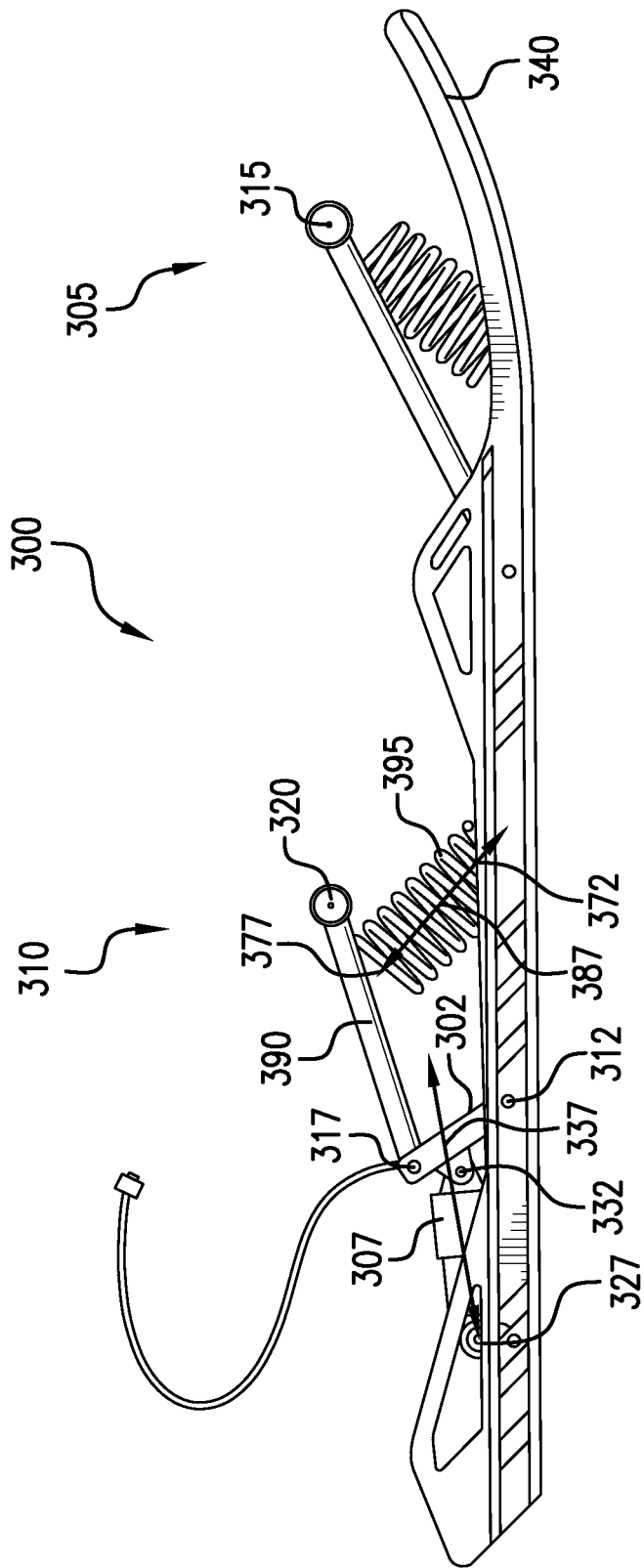

FIGS. 3A-3B depict a side elevation view of an exemplary RASC system along with ranges of positions for a snowmobile tunnel's pivot points. This figure will be used to demonstrate the various positions that an exemplary snowmobile tunnel may attain relative to an exemplary track assembly. In the FIG. 3A depiction, an exemplary RASC system 300 includes a front suspension assembly 305 and a rear suspension assembly 310. Each suspension assembly 305, 310 has a tunnel connector 315, 320 for connecting each suspension assembly 305, 310 to a snowmobile chassis (not depicted). In the depicted embodiment, each tunnel connector 315, 320 may pivotably connect to a rigid snowmobile tunnel (not depicted). A constant distance 325 between the tunnel connectors 315, 320 may be maintained at a constant distance 325 when pivotably connected to fixed locations on the rigid snowmobile tunnel.

The front suspension assembly 305 includes a front torque arm 330 and a front shock 335. The front torque arm 330 is pivotably coupled to a slide rail 340 at a rail/arm pivot point 345. The front tunnel connector 315 may trace an arc of travel 350 about the rail/arm pivot point 345. The front shock 335 couples to the slide rail 340 at a rail end 355 and couples to the front torque arm 330 at an arm end 360. The front shock 335 may have an operable length that extends and contracts in response to forces imparted to the front shock 335 during snowmobile operation. For example, the front shock 335 may have a maximal length 365 when fully extended and a minimum length 370 when fully contracted. The arc of travel 350 of the front tunnel connector 315 may be limited by the maximum length 365 and minimum length 370 of the front shock 335, for example. This arc of travel 350 may represent a one-dimensional travel path that a front pivot point 375 of the front tunnel connector 315 may trace as the front torque arm 330 moves in response to forces resulting from snowmobile operation. The arc of travel 350 may also represent the snowmobile tunnel's travel at the tunnel location of the front pivot point 375 with respect to the slide rail 340.

This exemplary arc of travel 350 may represent a relation between a vertical position and a horizontal position of the front pivot point 375. For example, when the front pivot point 375 is at the position 380 associated with the maximum extension of the front shock 335, the front pivot point 372 will have both a specific vertical coordinate and a specific horizontal coordinate with reference to the slide rail 340. And when the front pivot point 375 is at the position 385 associated with the minimum extension of the front shock 335, the front pivot point 375 again will have both a specific vertical coordinate and a specific horizontal coordinate with reference to the slide rail, albeit different from those coordinates corresponding to the maximum extension of the front shock 335. In this way, the snowmobile tunnel's position is restricted by the one-dimensional arc segment 350 swept by the pivot point 375. The shock length may vary in response to loading conditions of the snowmobile between the minimum extension and the maximum extension.

In FIG. 3B, the rear suspension assembly 310 includes a rear torque arm 390, a rear shock 395, a rear scissors member 302, and an adjustable coupling member 307. The rear scissors member 302 is pivotably coupled to the slide rail 340 at a scissors/rail pivot point 312. The scissors member 302 has a torque-arm pivotable connector 317 that may trace an arc of travel 322 about the scissors/rail pivot point 312. The adjustable coupling member 307 couples to the slide rail 340 at a rail end 327 and couples to the scissors member 302 at a scissors end 332. The adjustable coupling member 307 may have an operable length that extends and contracts in response to forces imparted to the adjustable coupling member 307 during snowmobile operation. For example, the adjustable coupling member 307 may have a maximal length 337 when fully extended and a minimum length 342 when fully contracted. The arc of travel 322 of the torque-arm pivotable connector 317 may be limited by the maximum length 337 and minimum length 342 of the adjustable coupling member 307, for example. This arc of travel 322 may represent a one-dimensional travel path that a scissors/arm pivot point 347 of the torque-arm pivotable connector 317 may trace as the scissors member 302 moves in response to snowmobile operation. The arc of travel 322 may also represent the rear torque arm's travel at the location of the scissors/arm pivot point 347 with respect to the slide rail 340.

The rear torque arm 390 is connected to the scissors member 302 via the torque-arm pivotable connector 317. When a longitudinal axis of the rear torque arm 390 is maintained in alignment with a longitudinal axis of the scissors member 302, the rear tunnel connector 320 may trace an arc of travel 352 about a scissors/rail pivot point 312. This arc or travel may represent one boundary that a rear pivot point 357 of the rear tunnel connector 320 may trace as the rear torque arm 390 moves in response to forces resulting from snowmobile operation.

Other boundaries of travel may include an arc 362 traced by the rear tunnel connector 320 pivoting about the scissors/arm pivot point 347 when the scissors member 302 is at its most forward position associated with the maximum extension of the adjustable coupling device 307. Another boundary of operable travel is an arc 367 traced by the rear tunnel connector 320 pivoting about its scissors/arm pivot point 347 when the scissors member 302 is at its most rearward position associated with the minimum extension of the adjustable coupling device 307.

The rear shock 395 couples to the slide rail 340 at a rail end 372 and couples to the rear torque arm 390 at an arm end 377. The rear shock 395 may have an operable length that extends and contracts in response to forces imparted to the rear shock 395 during snowmobile operation. For example, the rear shock 395 may have a maximal length 382 when fully extended and a minimum length 387 when fully contracted. Two more boundaries of travel may be the arcs 392, 397 swept by a minimum and maximum extension of the rear shock member 395, respectively.

Figure 4:
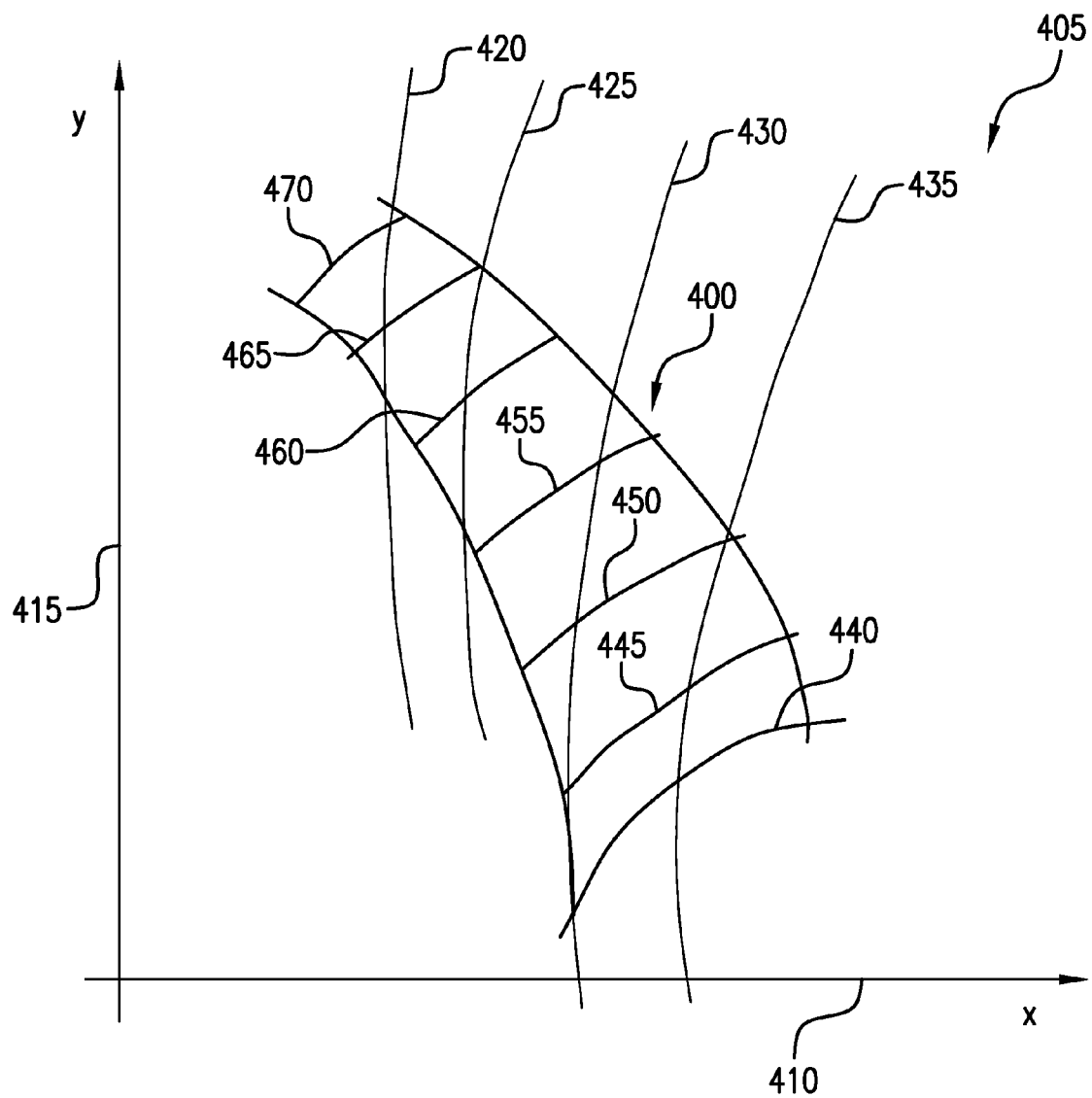
FIGS. 4-5 depict an exemplary two-dimensional region of travel of the rear tunnel connector 320 with respect to the slide rail 340.
Figure 5:
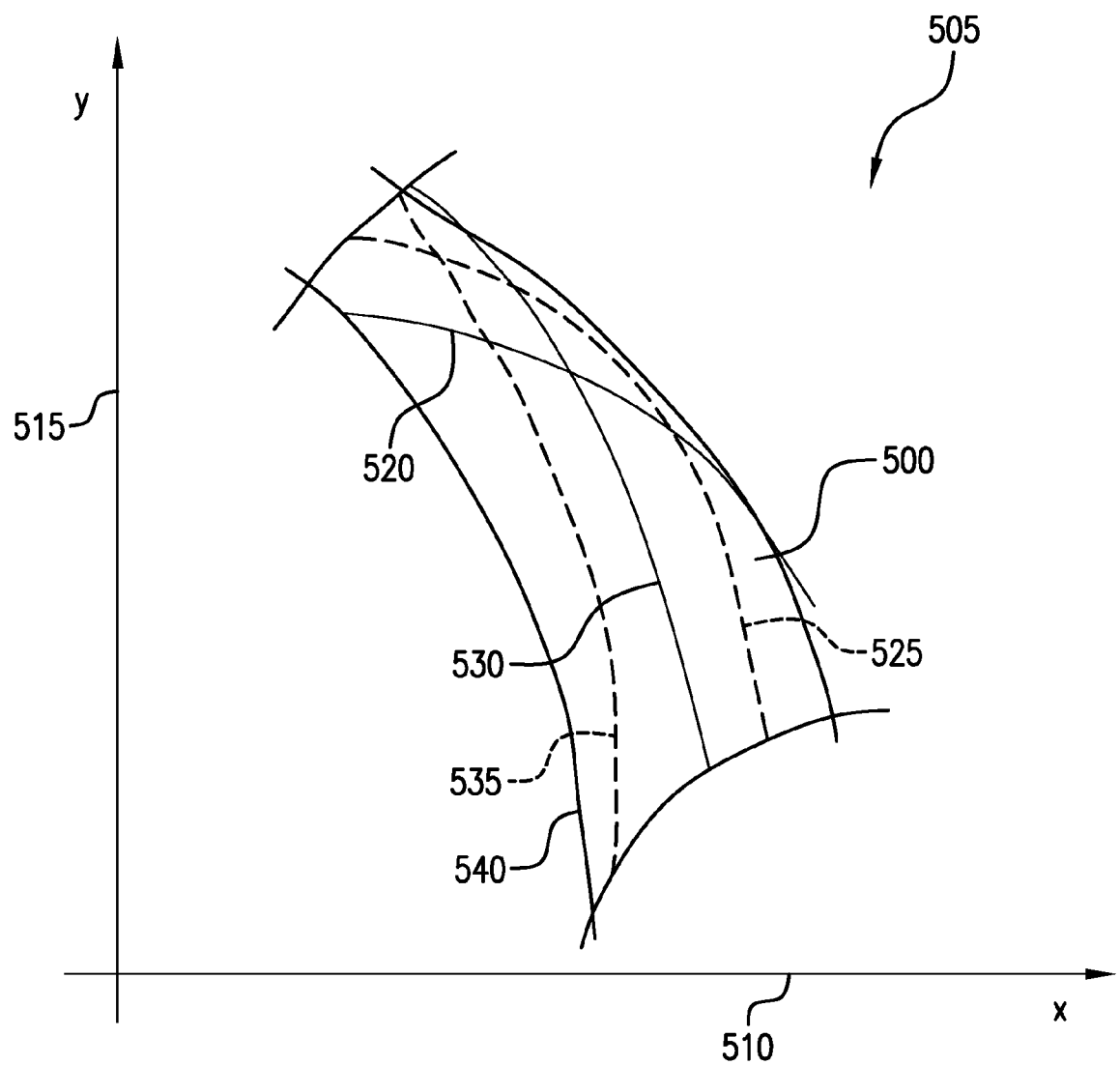

FIGS. 4-5 depict an exemplary two-dimensional region of travel of the rear tunnel connector 320 with respect to the slide rail 340. In the FIG. 4 depiction, the two-dimensional region of travel 400 has been depicted on a coordinate plane graph 405. A horizontal axis 410 represents the horizontal position of the rear pivot point 357. A vertical axis 415 represents the vertical position of the rear pivot point 357. The two dimensional region of travel 400 may represent all the positions that the rear pivot point 357 of the rear tunnel connector 320 may trace as the rear torque arm 390 moves in response to forces resulting from snowmobile operation.

The rear pivot point 357 can be translated throughout the two dimensional region of travel 400. But because the front and rear pivot points 375, 357 of the tunnel are maintained at a constant separation distance 325, the travel of the front pivot point 375 may affect the travel of the rear pivot point 357 within each reference point's domain of travel, and vice versa. When the adjustable coupling member 307 provides relatively low resistance to length adjustment of the adjustable coupling member 307, the remotely adjustable coupling system (RASC) is said to be in the uncoupled mode. When in the uncoupled mode, the rear scissors member 302 is relatively free to pivot about the scissors/rail pivot point 312. When in the uncoupled mode, the rear shock 395 may expand and/or contract independent of the position of the front shock 335, for example.

When the adjustable coupling member 307 provides resistance to length changes in the adjustable coupling member 307, the remotely adjustable coupling system (RASC) is said to be in the coupled mode. When in the coupled mode, it may require great force to pivot the scissors member 302 about the scissors/rail pivot point 312. When in the coupled mode, the rear torque arm 390 then may pivot about the scissors/arm pivot point 347 which may be at the location determined by the position of the scissors member 302. The rear torque arm 390 may trace an arc of preferred travel about the scissors/arm pivot point 347.

When in the uncoupled mode, the rear shock 395 may contract due to the rear suspension system 310 of the track assembly going over a bump. When in the uncoupled mode, the rear pivot point 357 may trace an arc of independence 420, 425, 430 or 435, about the scissors/arm pivot point 347. These arcs of independence represent traces of constant distance between the front pivot point 375 and the rear pivot point 357, with the front pivot point 375 remaining in a fixed location. When the front pivot point 375 is at the end point of its one-dimension arc of travel 350 associated with the maximum extension of the front shock 335, the corresponding arc of independence may be 420. But when the front pivot point 375 is at the end point of its one-dimension arc of travel 350 associated with the minimum extension of the front shock 335, the corresponding arc of independence may be 435. The two arcs of independence 425, 430 may be associated with the front pivot point 375 being at intermediate locations on the arc of travel 350 between these two end points. When the rear suspension system 310 moves along one of the arcs of independence 420, 425, 435, 435, the front suspension does not need to move in response to the rear suspension movement. This type of operation may be called uncoupled operation.

But when the rear suspension system 310 compresses or expands along an arc of independence so that it reaches one of the boundaries of the two-dimensional region of travel 400, then further compression or expansion may affect the compression or expansion of the front shock 335. This type of operation may be called boundary coupling. As long as the rear pivot point 357 travels along one of the arcs of independence 420, 425, 430, 435, the snowmobile's tunnel may pivot about the front pivot point 375, and may otherwise leave undisturbed the front shock absorber 335. But if the rear pivot point 357 travels not on one of the arcs of independence, the front pivot point 375 may be required to move along its arc of travel 350 so as to maintain the separation distance 325 between the front and rear pivot points 375, 357.

In the FIG. 5 depiction, the two-dimensional plane of operable travel 500 has been depicted on a coordinate plane graph 505. A horizontal axis 510 represents the horizontal position of the rear pivot point 357. A vertical axis 515 represents the vertical position of the rear pivot point 357. The two dimensional region of travel 500 may again represent all the positions that the rear pivot point 357 of the rear tunnel connector 320 may trace as the rear torque arm 390 moves in response to forces resulting from snowmobile operation.

The rear pivot point 357 can be translated throughout the two dimensional region of operable travel 500. When the adjustable coupling member is put in a coupling mode, the adjustable coupling member becomes resistant to compression or extension of its length. In the depicted two-dimensional plane of operable travel 500, arcs of dependence 520, 525, 530, 535, 540 are drawn. Each of these arcs of dependence 520, 525, 530, 535, 540 may represent traces of the rear pivot point 357 as the rear torque arm 320 is pivoted about the scissor/arm pivot point 347, when the scissors member 302 is in various positions. When the scissors/arm pivot point 347 is at its rearmost position associated with the adjustable coupling device 307 at its most compressed length, the corresponding arc of dependence trace is 520. When the scissors/arm pivot point 347 is at its most forward position associated with the adjustable coupling device 307 at its most extended length, the corresponding arc of dependence trace is 540. The three arcs of dependence 525, 530, 535 are associated with the adjustable coupling device at intermediate positions between the rearmost position and the most forward position of the scissors/arm pivot point 347.

The arcs of dependence 520, 525, 530, 535, 540 each represent an x-y functional relation of travel when the adjustable coupling device 307 is in the coupled mode. Note that these arcs of dependence 520, 525, 530, 535, 540 are different than the arcs of independence 420, 425, 430, 435. As such, when the rear pivot point 357 travels along one of these arcs of dependence 520, 525, 530, 535, 540, the front shock 335 must too respond to the movement of the rear shock 395. For example, when accelerating, a weight transfer to the rear may compress the rear suspension assembly 310.

When in the coupled mode, this compression may be along one of the arcs of dependence, say 530, for example. As the rear pivot point 357 descends vertically along this arc of dependence 530, the rear pivot point 357 also moves horizontally in a forward direction. Because the rear reference point 357 moves forward, the front pivot point 375 must move forward, due to the front pivot point 375 being a constant or fixed distance 325 from the rear pivot point 357. But the front reference point must travel along its arc of operable positions. So as the front reference point moves in the forward direction, it also descends vertically corresponding to the path of the arc of operable positions. This descent of the reference point compresses the forward shock absorber. In this way, when coupled, a weight transfer to the rear is resisted by both the rear shock absorber and the front shock absorber. Increased suspension stiffness during weight transfer is one advantage of a coupled suspension. Increased suspension stiffness during weight transfer may prevent the snowmobile from over rotating during acceleration. And when accelerating up a slope, such over rotation may present a danger of the vehicle rolling back over and on top of the rider.

Figure 6:
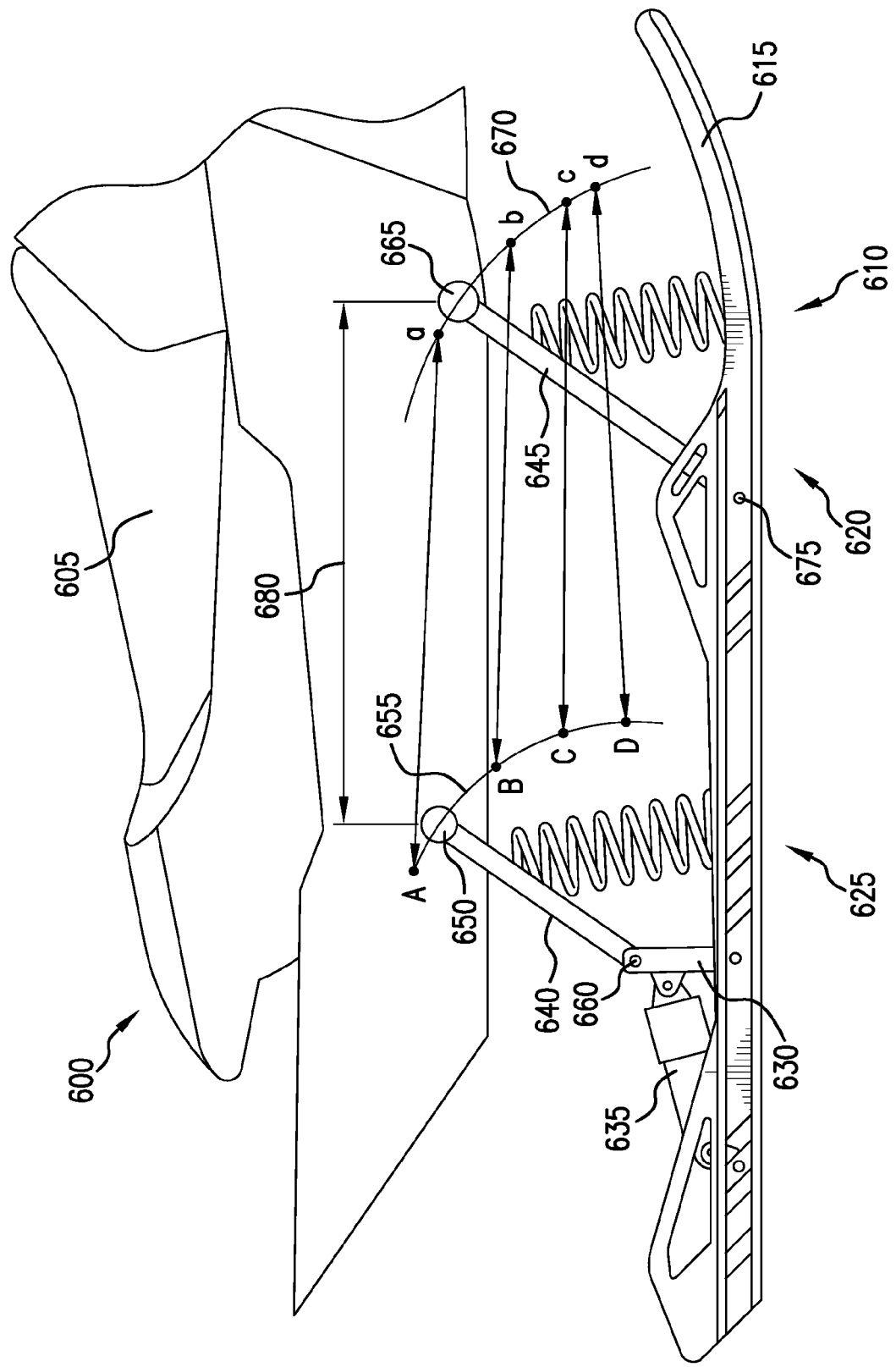
FIG. 6 depicts an exemplary snowmobile with RASC and its coupled mode suspension behavior.

FIG. 6 depicts an exemplary snowmobile with RASC and its coupled mode suspension behavior. In the FIG. 6 depiction, a snowmobile 600 includes a chassis 605 supported by a rear track assembly 610. The rear track assembly 610 has a slide rail 615, a front suspension system 620, and a rear suspension system 625. The rear suspension system 625 has a scissors member 630 that is inhibited from moving by a remote coupling member 635 in a coupled state. The rear suspension system 625 has a rear torque arm 640 pivotably coupled to the scissors member 630 and to the chassis 605. The front suspension system 620 has a front torque arm 645 pivotably coupled to the slide rail 615 and to the chassis 605. The rear torque arm 640 has a rear pivot point 650 that traces an arc of travel 655 about a scissors/arm pivot point 660. The front torque arm 645 has a front pivot point 665 that traces an arc of travel 670 about a rail/arm pivot point 675. The rear pivot point 650 is located a fixed distance 680 from the front pivot point 665. In the coupled mode, as the rear pivot point moves from points A, B, C, and D, the front pivot point must move from points a, b, c, and d to maintain the proper separation distance 680 between the front and rear pivot points 665, 650.

Arcs of constant rear shock length 440, 445, 450, 455, 460, 465, 470 are depicted in FIG. 4 as well. These arcs of constant rear shock length 440, 445, 450, 455, 460, 465, 470 are arcs that represent the position of the rear pivot point 357 where the rear shock 395 remains at a fixed length. When in the uncoupled mode, if the front suspension 335 compresses or expands in response to forces resulting from snowmobile operation, the front pivot point 375 may move on its arc of travel 350. When the front pivot point 375 moves along this arc of travel 350, the horizontal position of the front pivot point 375 may move. When the horizontal position of the front pivot point moves, the horizontal position or the rear pivot point 357 may need to move, due to the fixed distance 325 between these two pivot points 375, 357. The rear pivot point 357 may move along one of these arcs of constant rear shock length 440, 445, 450, 455, 460, 465, 470. In moving along one of these arcs of constant shock length 440, 445, 455, 460, 465, 470, the shock remains in the same state of compression and/or expansion. In this way the rear shock need not be contracted in response to the front shock's contraction.

The relative radii of pivoting of the torque arms causes a ratio of coupling between the two suspension systems. For example, in the FIG. 6 depiction, the rear torque arm 640 has a smaller pivot radius 685 than the radius 690 of the front torque arm. The smaller radius 685 of the rear torque arm may result in a smaller horizontal translation of the rear pivot point 650 corresponding to a specific vertical movement of the rear pivot point 650. Because the horizontal translation is modest for a small radius pivot operation, the front pivot point 665 may be required to move a corresponding modest distance along its arc of travel 670. The front suspension system 620 may compress less than the rear suspension system 625 due to the ratio of pivot radii. Conversely, a force upon the front suspension system 620 may force the rear suspension system 625 to compress or expand more than the front suspension system when coupled. In some embodiments, the radii ratio may be used to provide a greater coupling from a rear suspension to a front suspension. In an exemplary embodiment the radii ration may be used to provide a greater coupling from a front suspension to a rear suspension, for example.

Figure 7:
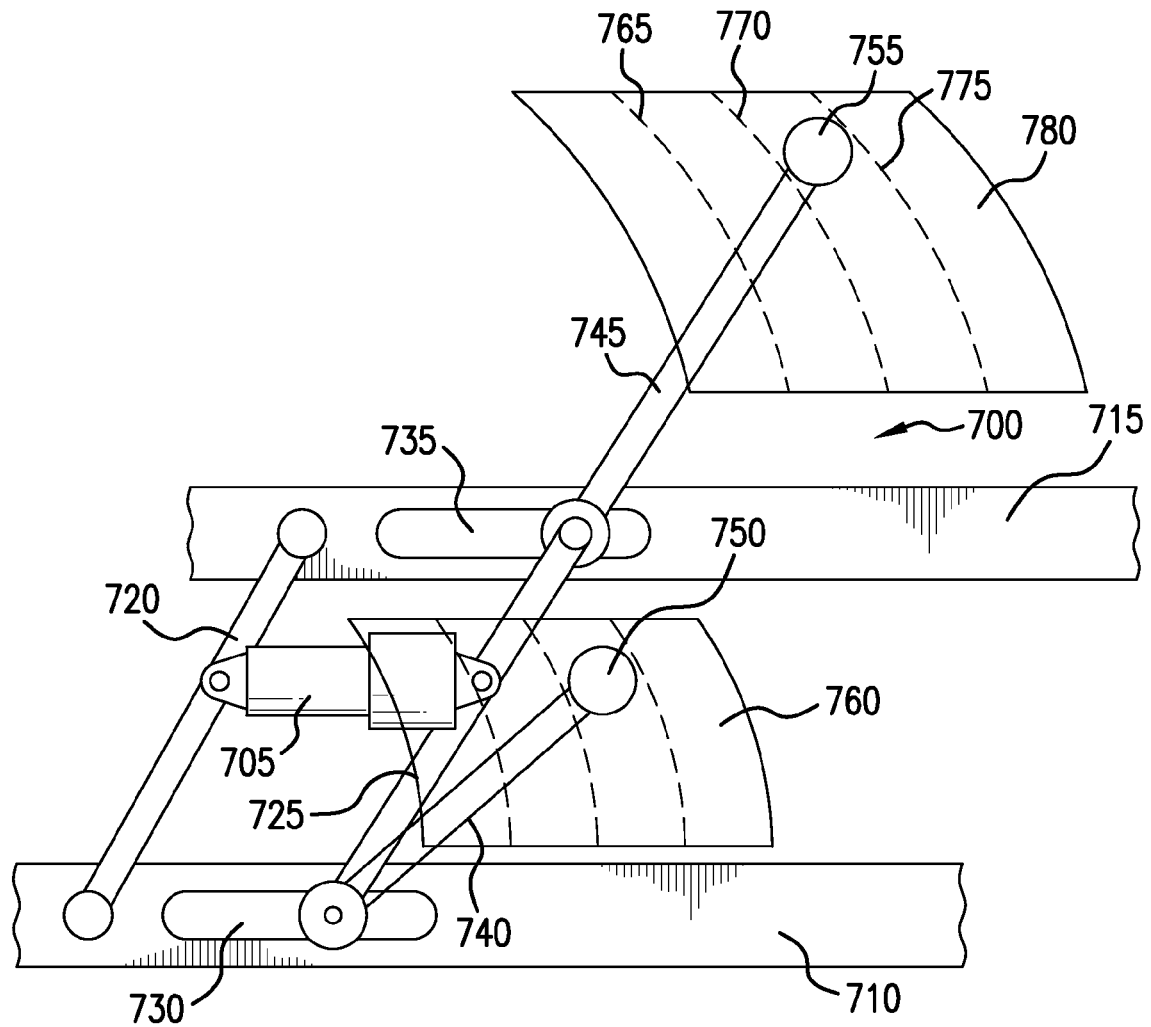
FIG. 7 depicts an exemplary remotely adjustable suspension member.

FIG. 7 depicts an exemplary remotely adjustable suspension member. In the FIG. 7 embodiment, a remotely adjustable suspension member 700 may be a front suspension member and/or a rear suspension member. In this figure, a dynamically adjustable shock 705 is connected to the slide rails 710, 715 via a fixed axis 720. The dynamically adjustable shock 705 is also connected to a sliding member 725, which is slidably coupled to the slide rails 710, 715 via slidable slots or tracks 730, 735. Torque arms 740, 745 are pivotably coupled to the sliding member 725. When the dynamically adjustable shock 705 is in an uncoupled state, the sliding member 725 may slide with relatively little resistance in the slots or tracks 730, 735 in the slide rails 710, 715. When the dynamically adjustable shock 705 is in a coupled state, the sliding member 725 may be resisted from sliding within the slots or tracks 730, 735. The torque arms 740, 745 each has a tunnel connector 750, 755 at a distal end of each torque arm 740, 745. Each tunnel connector 750, 755 may roam or move throughout a two-dimensional finite range 760 in response to forces resulting from snowmobile operation. When the dynamically adjustable shock 705 is in a coupled state, each of the tunnel connectors 750 may have a one-dimensional arc of preferred travel 765, 770, 775.

There are many ways to connect various elements together to achieve a Remotely Adjustable Suspension Coupling (RASC). A suspension may be remotely coupleable and uncoupleable using different types of suspension mechanisms and different types of support members. A suspension system may be uncoupled if the system has a sufficient number of degrees of freedom so that a first member can be operated substantially independently of a second member. For example, a suspension system may have two or more suspension members. The suspension system may have enough degrees of freedom in its mechanism so that a first member may be moved without requiring a second member to move significantly. And then, to make the uncoupled system into a coupled system, one or more degrees of freedom may be removed or inhibited so that movement of the first member necessarily requires movement the second member as well. The change between a largely uncoupled state to a largely coupled state thus may be achieved by simply removing and/or inhibiting one or more of the degrees of freedom in the suspension system. Then to change from the coupled state back to the uncoupled state, the removed and/or inhibited degrees of freedom can be uninhibited and/or returned.

One way to achieve this inhibition of a degree of freedom in a suspension member may be to increase the resistance to movement of a movable joint in that member's suspension mechanism. One way to increase the resistance to movement of a movable joint is by using a variable damping member connected between two rigid members joined by an otherwise movable joint. Some exemplary damping members may vary their damping resistance by dynamically restricting the flow of oil within a shock body. In turn, this dynamic restriction of flow may be achieved by dynamically changing the size of one or more apertures through which the oil must flow in response to a change is length or size of a shock body, for example. Such apertures may be remotely changed by hydraulic means. In some exemplary systems, mechanical means may be used to remotely affect a change in a system. Electronic means may also be used to remotely change a parameter of a suspension system.

Figure 8:
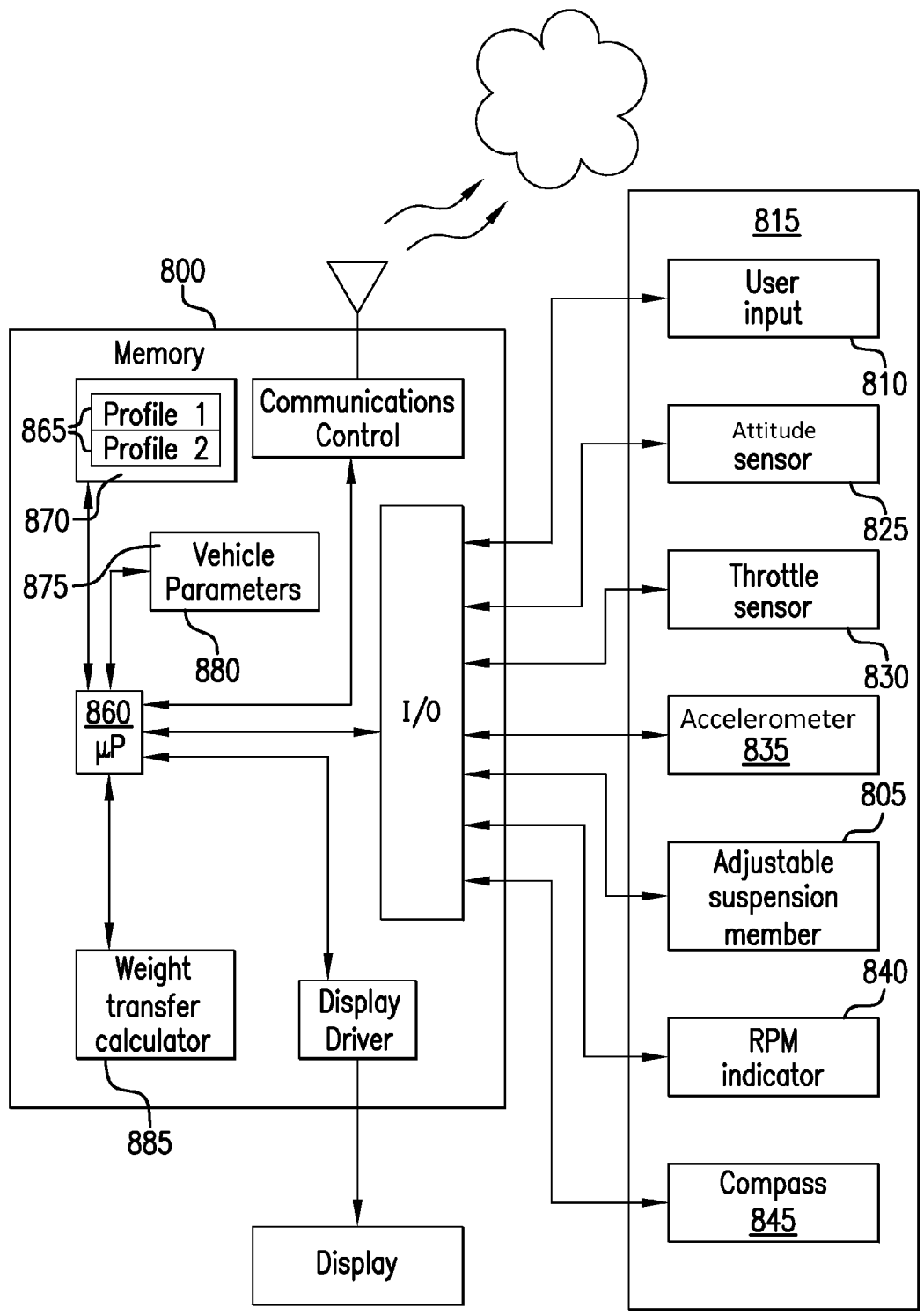
FIG. 8 depicts a block diagram of an exemplary variably-coupled suspension control system.

FIG. 8 depicts a block diagram of an exemplary variably-coupled suspension control system. In the FIG. 8 embodiment, an exemplary coupling controller 800 is configured to send control signals to an adjustable suspension member 805. The exemplary coupling controller 800 receives inputs from a user 810, a snowmobile 815, and a communications interface 820. The snowmobile 815 may be equipped with various sensors. For example, the snowmobile 815 may have an attitude sensor 825 to sense the roll, pitch, and/or yaw attitudes of the snowmobile 815. The snowmobile may include a throttle sensor 830 and/or an accelerometer 835, for example. In some embodiments, the snowmobile may be equipped with an RPM sensor 840 and/or a six-axis forces sensor. In an exemplary embodiment, a six-axis force sensor may include a gyroscope and an accelerometer. Exemplary gyroscopes may, for example, detect rotational forces such as changes to pitch, roll and yaw. Exemplary accelerometers may, for example, detect translational forces in an x, y, and z direction. In some embodiments a compass 845 and/or a GPS receiver may provide inputs to a coupling controller. One or more suspension members may have sensors indicating one or more parameters associated with the suspension members, for example. The coupling controller 800 may receive signals from one or more of these sensors for use in calculating a desired amount of coupling between two or more suspension members.

The coupling controller 800 may send signals to a display 850. The signals may be indicative of one or more of the signals received by the one or more sensors, for example. One or more of the display signals may be indicative of the amount of coupling between two or more suspension members, for example. In some embodiments, the coupling controller 800 may communicate with a network. In the depicted embodiment, the coupling controller 800 is shown having an antenna 855 for communicating wirelessly. In some embodiments, wireless communications may be employed for communications between one or more sensor and the coupling controller 800. In some embodiments, wireless communication may be performed between the user and the coupling controller 800. In an exemplary embodiment wireless communication may be performed between a handheld wireless device, such as a phone and/or a tablet computer and the coupling controller 800. In some embodiments, wireless communication may be performed between two or more snowmobiles, for example. In some embodiments, the coupling controller 800 may be in communication with a network computer.

The coupling controller 800 may include a processor 860. The processor may receive stored profiles 865 of operation from a memory 870. Each profile 865 may include a predetermined set of parameters for governing the operation of a remotely adjustable coupling member. For example, snowmobile riders may each manually configure coupling controller 800 according to the rider's own riding preferences. And then each snowmobile rider may save parameters associated with the manually configured settings. Riders may share their profiles 865 with others and in this way accumulate a variety of coupling profiles 865. Some riders may have different profiles 865 corresponding to different riding conditions. For example, one rider may have a desired profile 865 corresponding a particular mountain that the rider frequents, and another profile 865 for a flat course that the ride races.

Each profile 865 may include preference parameters associated with one or more of the sensor inputs, for example. One rider may set a parameter associated with an attitude sensor 825. For example, when the pitch sensor of the snowmobile shows a weight transfer to the rear of a snowmobile, the rider may set a parameter to invoke coupling at a particular pitch threshold. In some embodiments, the rider may set a parameter that linearly increases coupling as the pitch increases, for example. In some embodiments a rider may set a coupling parameter corresponding to an RPM sensor 840. The user may set the coupling ratio between two or more suspension members to relate to the RMP of the engine, for example.

The processor 860 may retrieve vehicle parameters 875 from a memory 880. Different types of vehicles may have different parameters associated with the vehicle. For example, for weight transfer calculations, a vehicle may have a parameter corresponding to the sprung weight of the vehicle. In some embodiments, the vehicle may have a parameter for the unsprung weight of the vehicle. In an exemplary embodiment the vehicle may have a parameter associated with the specific method of coupling two or more suspension members. For example, one vehicle parameter may relate a signal for a remote coupling member to an amount of coupling between two or more suspension members. The processor 860 may communicate with a weight transfer calculator 885. The processor 860 may supply signals to the weight transfer calculator 885. The supplied parameters may include signals received from one or more sensors. Supplied parameters may include signals received from a user input device 810. In some embodiments, supplied parameters may include vehicle parameters and/or user profiles. In an exemplary embodiment, supplied parameters may include a user's body weight.

Figure 9:
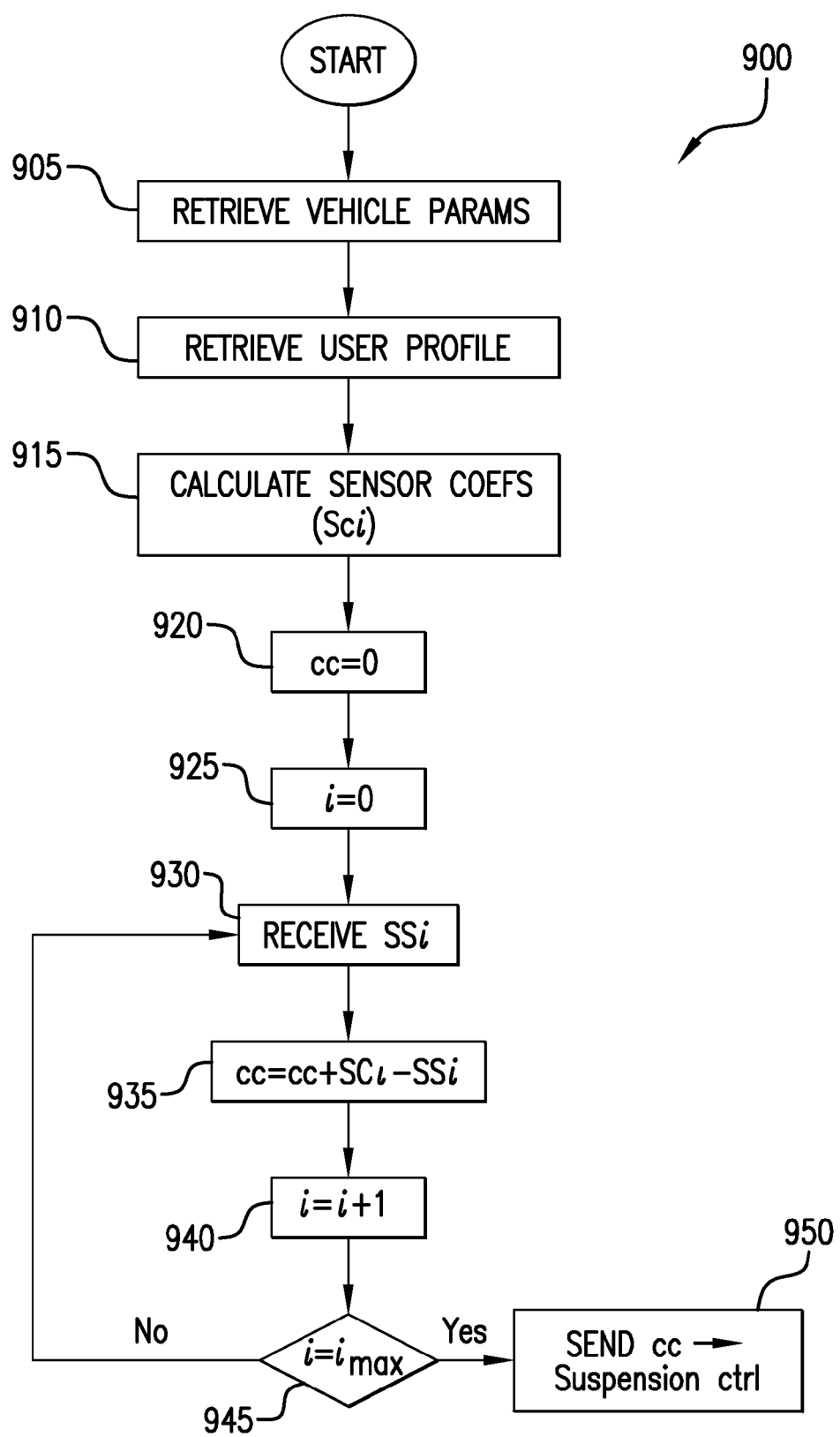
FIG. 9 depicts a method of calculating a coupling coefficient by an exemplary coupling controller.

FIG. 9 depicts a method of calculating a coupling coefficient by an exemplary coupling controller. FIG. 9 depicts a coupling coefficient calculation method 900 as performed by a processor 860 of an exemplary coupling controller 800. The method begins with the processor 860 retrieving, from member, a series of vehicle parameters 905. The processor 860 then retrieves a user profile from memory 910. The processor 860 then calculates sensor coefficients, SC, from the received profile parameters and vehicle parameters 915. The processor 860 zeroes the coupling control signal, CC, 920. The processor then initiates a sensor index, i, 925. The processor 860 then receives the sensor signal, SS, of the $i^{th}$ sensor 930. The processor 860 then multiplies the received sensor signal, SS, by the corresponding SC and adds the result to the CC signal 935. The processor 860 then increments the sensor index, i, 940. The processor 860 then compares the sensor index, i, with a maximum number of sensors, $i_{max}$, with which the vehicle is equipped 945. If the sensor signal, i, is not equal to the maximum number of sensor, $i_{max}$, then the processor 860 returns to step 930 and receives the next sensor signal. If, however, the sensor signal, i, is equal to the maximum number of sensors, $i_{max}$, then the processer 860 sends a signal corresponding to the calculated coupling control signal, CC, to the adjustable suspension member 950. The processor then returns to step 915 and initiates the sensor index, i.

In some embodiments, terms containing two or more sensor signals may be used in calculating a Coupling Control signal, CC. For example, in some embodiments a signal representative of a throttle sensor may be multiplied by a signal representative of an attitude may be used in the coupling calculation. This product of signals may then be weighted by a sensor coefficient, SC, corresponding to the product term. In some embodiments, terms corresponding to other functional combinations of sensor signals may be used. For example, trigonometric functions and/or logarithmic functions of terms or combinations of terms may be included in the calculation of a Coupling Control signal, CC. In some embodiments, some of the factors may be limited. For example, in some embodiments, a user profile may include a limit term. The limit term may be used to provide a maximum amount that a particular term is used in the coupling coefficient calculation. For example, a term proportional to the throttle sensor may have a maximum, beyond which further increases to the throttle position provides no more coupling. In some embodiments, terms can be limited as to how low they may be. In some embodiments, profiles may contain steps or ranges for terms. For example, in some embodiments, the coupling coefficient may be set to zero for all attitudes pitched below a particular threshold. The coupling coefficient may be set to one for all attitudes pitched above another threshold. And for all other attitudes, the coupling coefficient may be set to an intermediate value.

In some embodiments a Coupling Control signal, CC, may be generated as below:

$$CC = \sum_{i=1}^{i_{max}} SC_i SS_i + \sum_{i=1}^{i_{max}} \sum_{j=i}^{i_{max}} SC_{ij} SS_i SS_j$$

Here the Signal Coefficients, $SC_i$, multiply factors that include only individual Sensor Signals, $SS_j$. And the Signal Coefficients with two subscripts, $SC_{ij}$, multiply factors that involve the product of two Sensor Signals, $SS_i$ and $SS_j$. Various other formulas for generating a Coupling Control signal may be used. In some embodiments, a weight transfer may be calculated. The calculated weight transfer may be used to set the Coupling Control signal, CC. In some embodiments, the weight transfer calculation may use vehicle parameters in the calculation. The weight transfer calculation may use the weight of the rider in the calculation, in some examples. In some embodiments, the weight transfer calculation may use the value of acceleration to calculate weight transfer. In an exemplary embodiment, the weight transfer calculation may use an attitude of the vehicle. In some embodiments, an estimated weight transfer may be calculated. For example, a suspension controller may anticipate the acceleration based upon a signal indicative of the throttle position.

Figure 10:
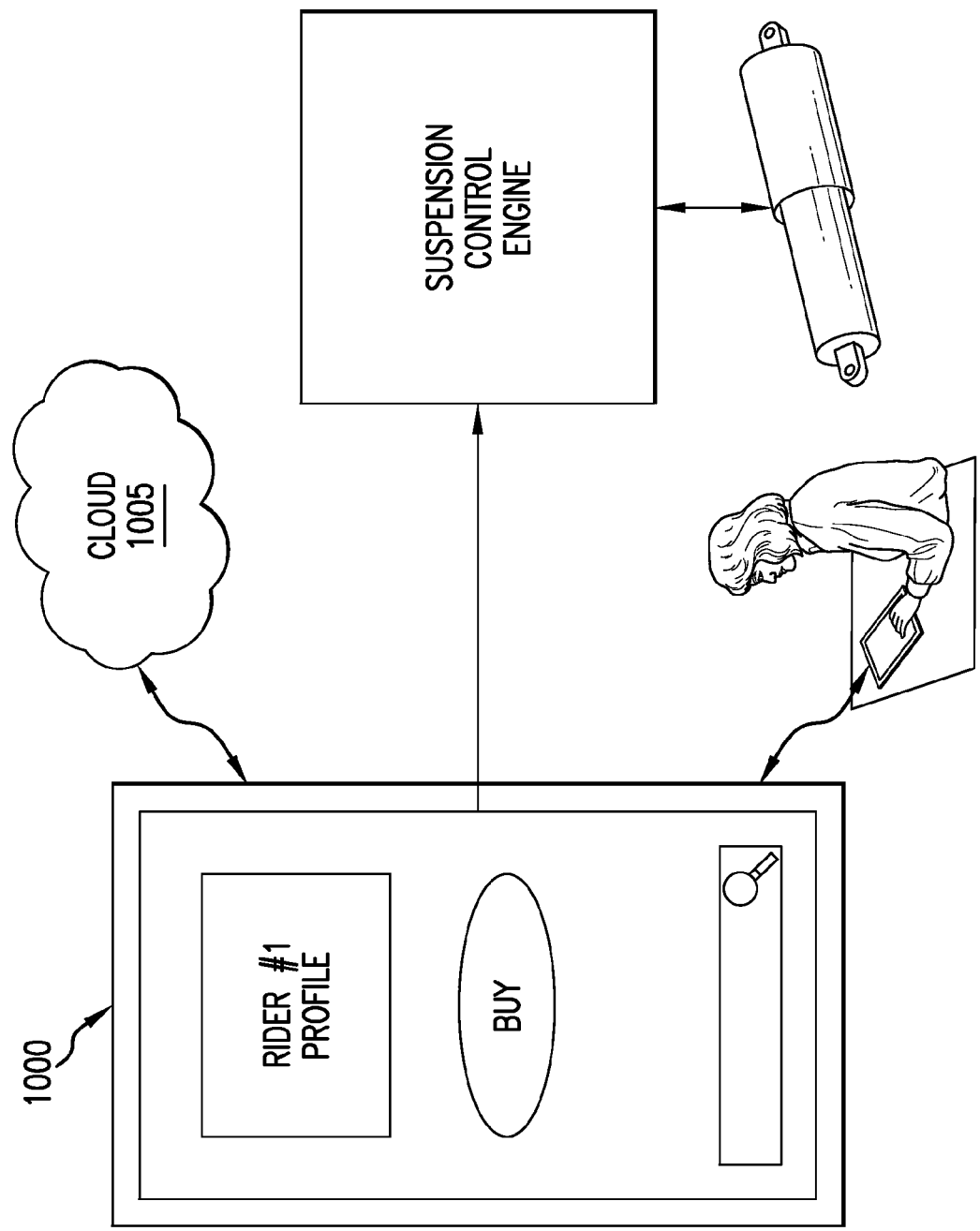
FIG. 10 depicts an exemplary screen shot of a mobile device operating a suspension profile app.

FIG. 10 depicts an exemplary screen shot of a mobile device operating a suspension profile APP. In the FIG. 10 depiction, a mobile device 1000 may be running a suspension profile APP. The mobile device 1000 may interface with cloud based app inventory service 1005, for example. The APP may be configured to download and/or upload suspension profiles to the APP inventory service 1005. The APP may be configured to communicate with other mobile devices running the APP. The APP may be configured to transfer profiles between two mobile devices, for example. In some embodiments, the mobile device may be configured to transfer profiles between a mobile device and a coupling controller. In an exemplary embodiment, the APP may be configured to modify a coupling profile. For example, a user who is significantly lighter than another may transfer the heavier user's profile to the lighter user's mobile device. The APP may automatically change the profile to correspond to the lighter user, for example. In some embodiments, the APP may reconfigure a profile for a different type of vehicle, for example.

Figure 11:
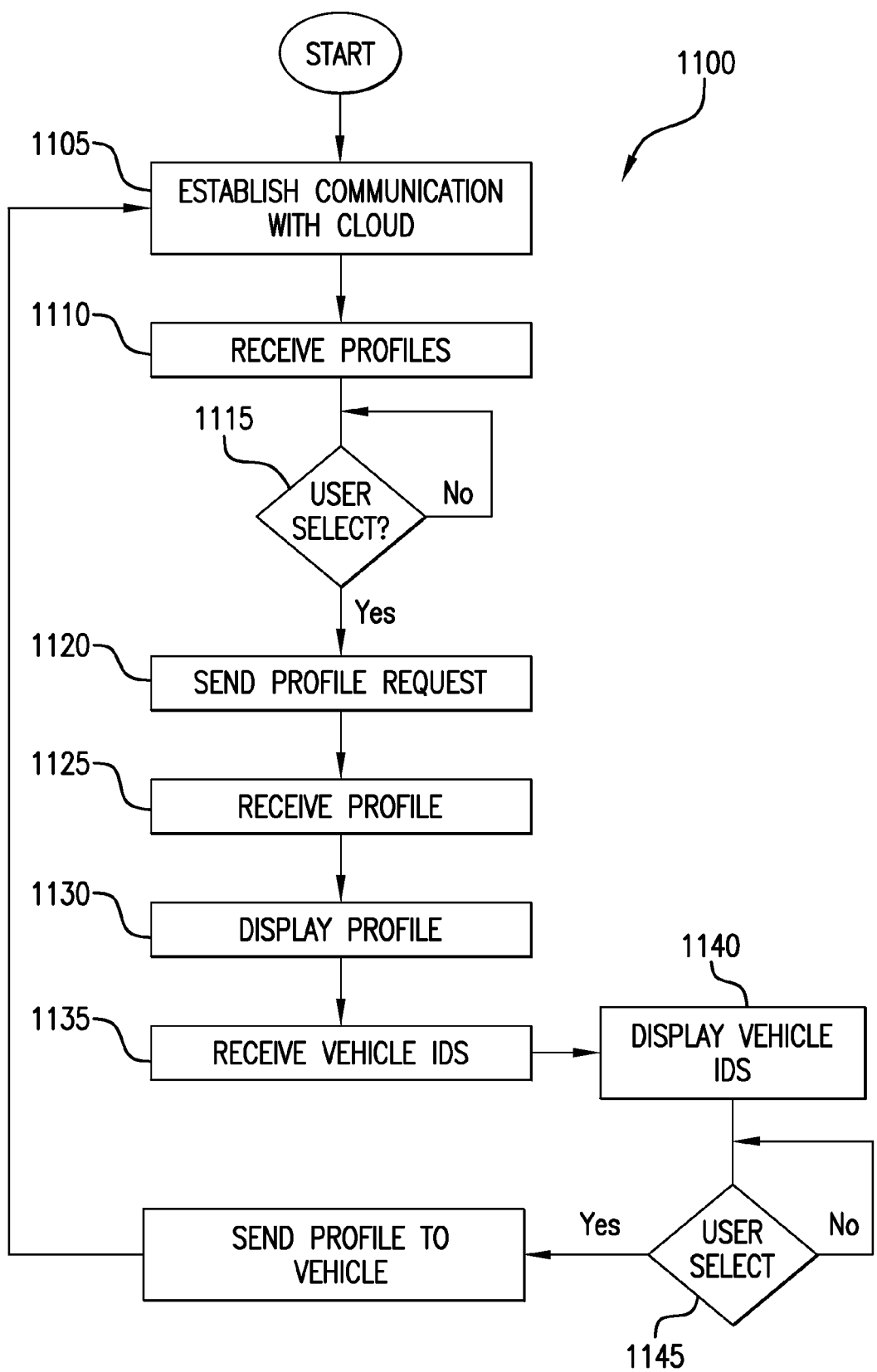
FIG. 11 depicts an exemplary method of managing coupling control profiles.

FIG. 11 depicts an exemplary method of managing coupling control profiles. FIG. 11 depicts a coupling profile management method 900 as performed by a processor on a mobile device 1000. The method begins with the processor establishing communications with the cloud based APP inventory service, 1105. The processor then receives signals associated with one or more profiles from the cloud based APP inventory service 1110. The processor then sends signals indicative of the one or more profiles to a display device of the mobile device 1000. The processor then waits to receive signals indicative of a profile selection from the user 1115. If the processor does not receive user input, the processor continues to wait at step 1115. If, however, the processor receives signals indicative of a profile selection, the processor next sends a request for transmission of the selected profile to the cloud based APP inventory service 1120. The processor then receives the requested profile from the cloud based APP inventory service 1125. The processor then sends a signal to the display device, the signals indicative of a successful receiving of the requested profile 1130. The processor then receives signals from one or more suspension controllers, the signals identifying the vehicle to which the suspension controller are coupled 1135. The processor then displays the one or more identified vehicles to which are coupled a suspension controller 1140. The processor then waits to receive signals indicative of selection from the user 1145. If the processor does not receive user input, the processor continues to wait at step 1145. If, however, the process receives signals indicative of a vehicle selection, the processor next sends signals associated with the received profile to the suspension controller corresponding to the selected vehicle 1150. The processor then returns to step 1105.

Figure 12:
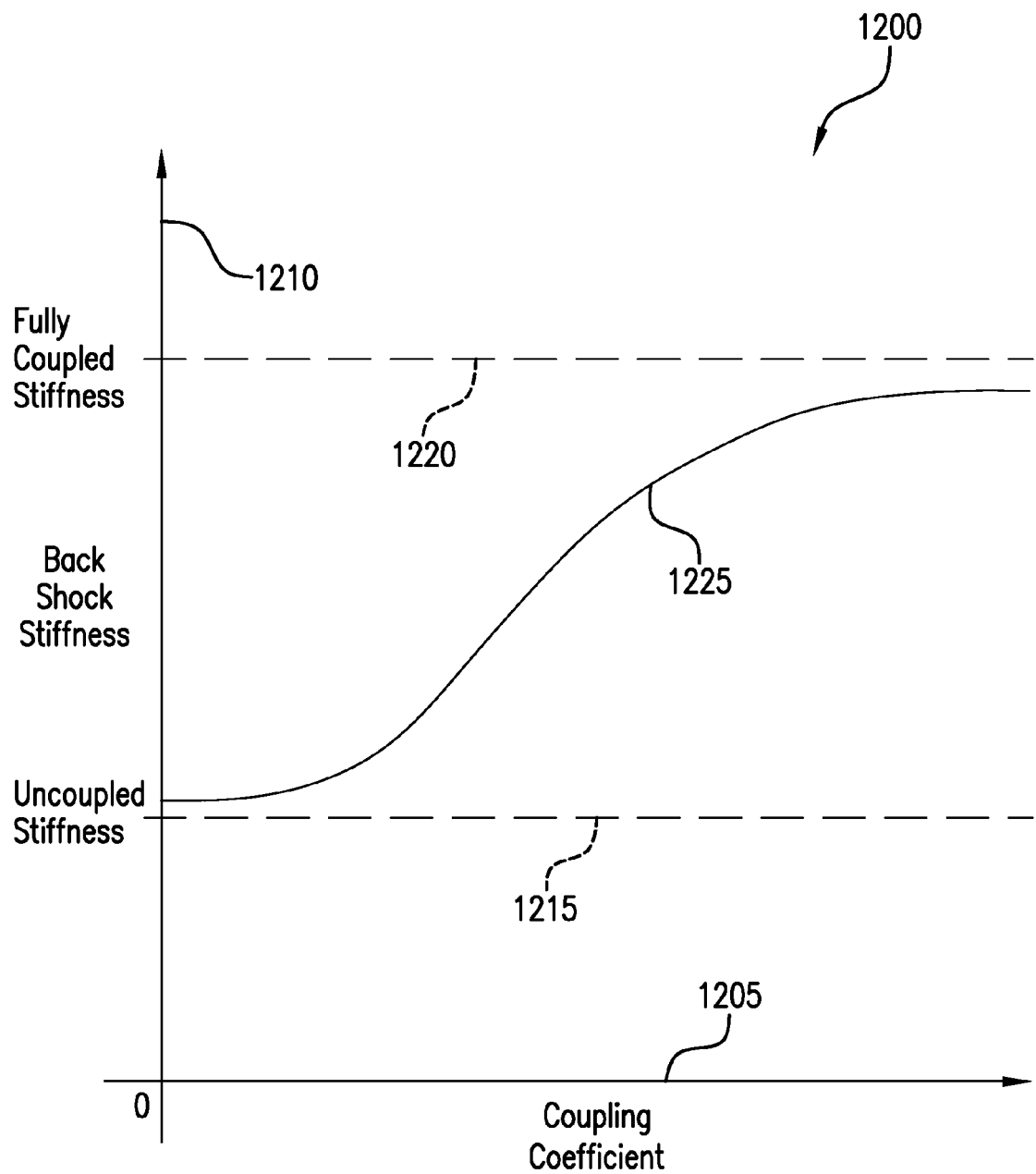
FIG. 12 depicts a graph 1200 demonstrating an exemplary relationship between a coupling coefficient and a shock's effective stiffness.

FIG. 12 depicts a graph 1200 demonstrating an exemplary relationship between a coupling coefficient and a shock's effective stiffness. In the FIG. 12 graph 1200, a horizontal axis 1205 represents the coupling coefficient of an exemplary RASC as may be affected by a user. The vertical axis 1210 represents the stiffness of a rear shock member. A lower stiffness limit 1215 is represented by a horizontal line. This lower limit may be substantially equal to the stiffness of the rear shock member as measured in isolation. For example, if the shock member were extracted from the RASC and tested for stiffness, the measured value of its stiffness may be substantially equal to the lower limit 1215 in this exemplary RASC system. An upper stiffness limit 1220 is represented by another horizontal line. The upper stiffness limit 1220 may be substantially equal to the sum of a rear shock member and a center shock member. For example, if two shock members are well-coupled, the two shock members may substantially operate in conjunction with one another. When a force is applied to a rear shock member, for example, the rear shock member may be unable to respond unless the center shock member similarly responds to the force. This shared response may result from the two members being coupled to one another. The figure also depicts a user's continuous adjustment 1225 of the coupling coefficient between two shock members. In this exemplary diagram, the RASC may provide continuous variable control between an uncoupled system and a substantial well coupled system of two shock members.

Figure 13:
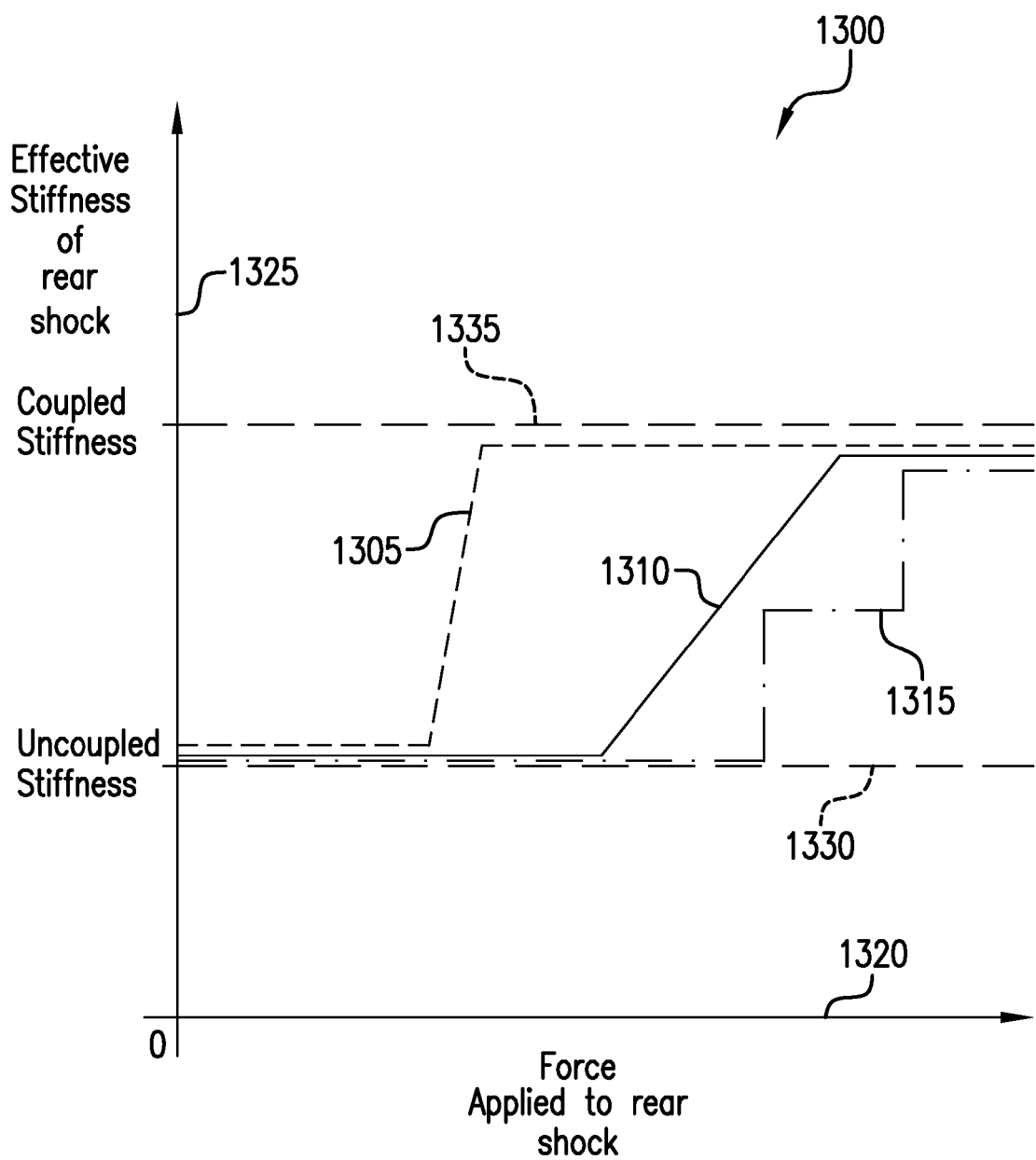
FIG. 13 depicts a graph demonstrating an exemplary relationship between a force applied to a rear shock and an effective stiffness of the rear shock.

FIG. 13 depicts a graph demonstrating an exemplary relationship between a force applied to a rear shock and an effective stiffness of the rear shock. In the figure, a graph 1300 depicts a few exemplary users' profiles 1305, 1310, 1315 when encountering a force applied to a rear shock member. For example, if a user turns a snowmobile in an upward mountain direction, a large force may be directed to a rear shock member. A horizontal axis 1320 represents the force applied to a rear shock member. A vertical axis 1325 represents an effective stiffness of the rear shock member. The rear stiffness may vary from a lower stiffness limit 1330 to an upper stiffness limit 1335.

In this exemplary figure, a first user's profile 1305 shows a user's selection of more stiffness when a relatively low force is applied to the rear shock member. The first user's profile is a relatively abrupt profile, as the user goes from a largely uncoupled state to a largely coupled state over a relatively small change in force. In some embodiments, the user may actuate a thumb lever to change the coupling. In some embodiments, the lever may be spring loaded so as to return to an uncoupled position when the user lets go of the lever. A second user's profile 1310 demonstrates a more gradual change in coupling over a longer range of applied force. In some embodiments, the user may rotate a handle-bar member in a continuous fashion to change the coupling of the suspension members. In one example, the rotating handle-bar member may remain at the last set position until the user rotates the handle-bar member to a new position. In some embodiments the rotating handle bar member may have detents. A third user's profile 1315 demonstrates a staircase type response to an increasing force applied to a rear shock member. This exemplary graph demonstrates a user's control of the coupling coefficient, which in turn changes the effective stiffness of the rear shock member. Various embodiments may provide up-down pushbuttons for control of the coupling. Each push of the up button may increase the coupling by a fixed amount. In some embodiments the up-down buttons may control a motor which in turn controls the coupling. For example, while a user holds a down-button depressed, the motor may turn in one direction until the user releases the button. The coupling may continuously decrease as the down-button remains depressed, until an end-point may be reached, for example. In this way, different users may choose to couple suspension members in different manners.

Figure 14A:
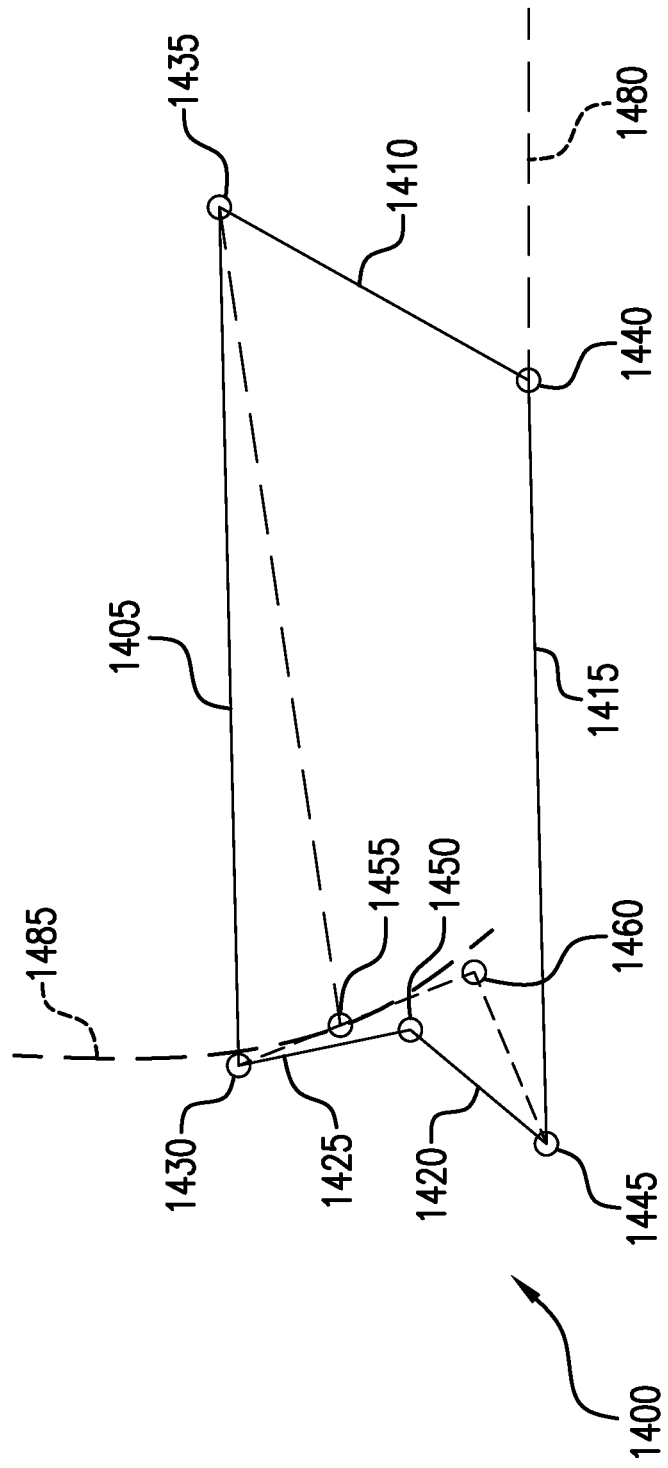
FIGS. 14A-14B depicts schematic drawings of an exemplary five-bar planar linkage systems.
Figure 14B:
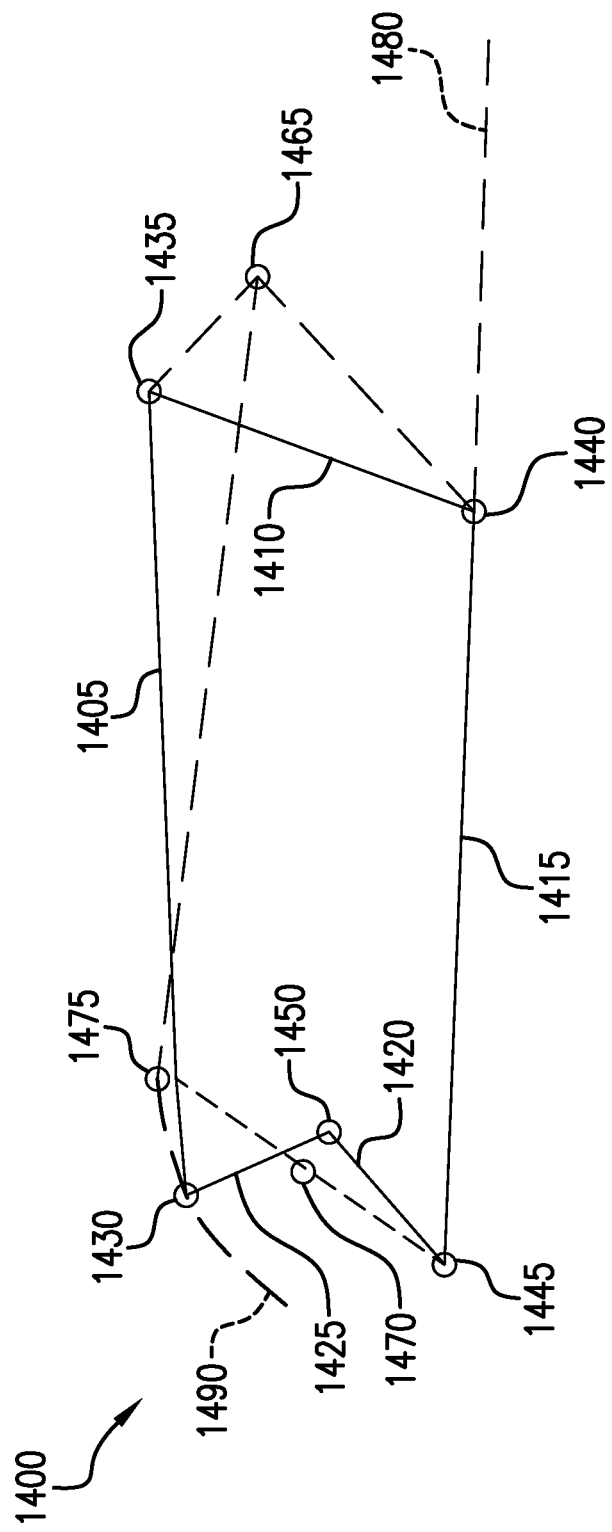

FIGS. 14A-14B depicts schematic drawings of an exemplary five-bar planar linkage systems. In the FIG. 14A depiction, an exemplary five-bar planar linkage mechanism 1400 include five rigid linkage arms 1405, 1410, 1415, 1420, 1425 and five vertices 1430, 1435, 1440, 1445 and 1450 that each connect pairs of adjacent linkage arms. Each linkage arm (e.g. 1405) is rigid so as to maintain a fixed distance between the two vertices (e.g. 1430 and 1435) that each linkage arm with its two adjacent neighbors. A snowmobile tunnel may be represented by the linkage member 1405. A snowmobile slide rail may be represented by linkage member 1415. A five-bar planar linkage has enough degrees of freedom to permit one vertex to be displaced while moving only one adjacent vertex in response. For example, if the vertex 1430 is displaced to position 1455 which is closer to a line 1480 containing the linkage arm 1415, the vertex 1450 may move in response to position 1460 as depicted. The vertex 1435 may not need to move in response to moving vertex 1430 closer to the line 1480 containing the linkage arm 1415. Such movements may represent a compression of a first shock member which may supply support to vertex 1430 as part of a snowmobile suspension, when in an uncoupled mode. A second shock member which may supply support to vertex 1435 of a snowmobile suspension may not need to compress/expand in response to compression/expansion of the first shock member. Line 1485 may represent an arc of independent travel for vertex 1430.

In the FIG. 14B depiction, again the exemplary five-bar planar linkage mechanism 1400 includes five rigid linkage arms 1405, 1410, 1415, 1420, 1425 and five vertices 1430, 1435, 1440, 1445, 1450 that each connect pairs of adjacent linkage arms. But in this figure, vertex 1435 is displaced to position 1465 which is closer to the line 1480 containing the linkage arm 1415, the vertices 1430, 1450 may move in such a way so as to keep vertex 1430 at substantially the same distance from the linkage arm 1415 before and after movement. To maintain a constant distance of separation between vertex 1430 and the line 1480 containing the linkage arm 1415, vertex 1450 may move to position 1470 and vertex 1430 may move to position 1475, as depicted. Such movements may represent a compression of the second shock member which may supply support to vertex 1435 as part of a snowmobile suspension, when in an uncoupled mode. The first shock member which may supply support to vertex 1430 of a snowmobile suspension may not need to compress/expand in response to compression/expansion of the second shock member. Line 1490 may represent an arc of constant shock compression for vertex 1430.

Figure 15:
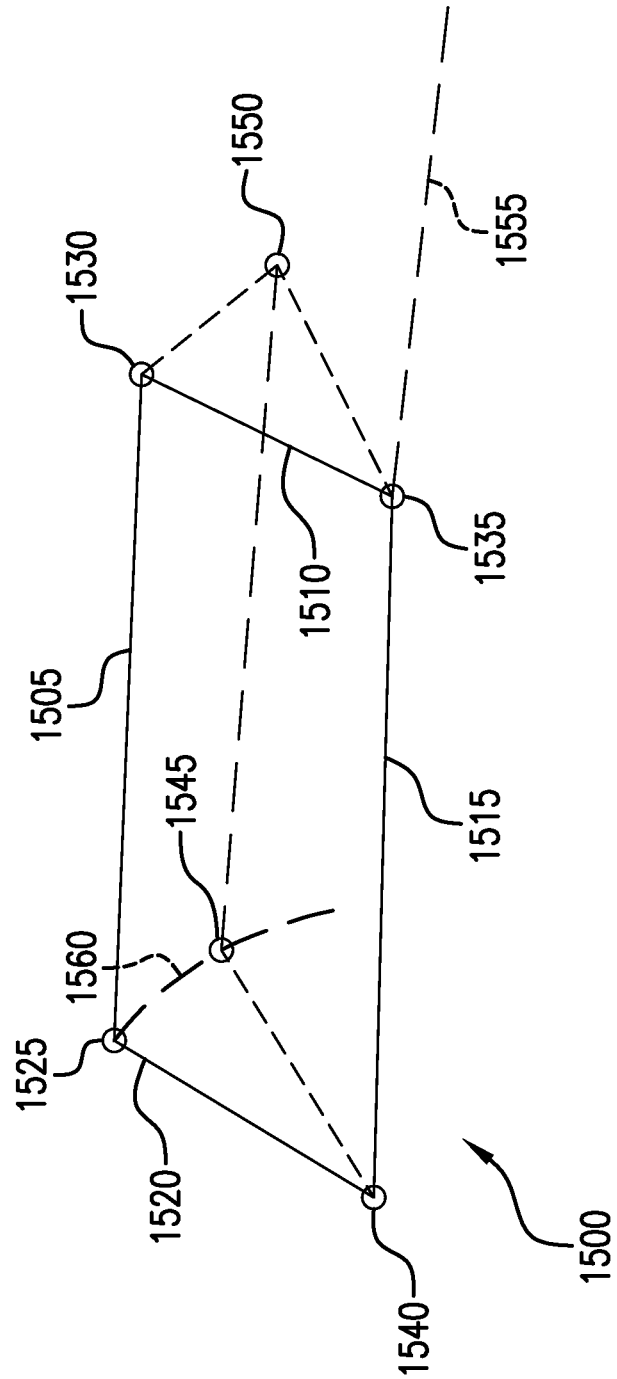
FIG. 15 depicts schematic drawings of an exemplary four-bar planar linkage systems.

FIG. 15 depicts schematic drawings of an exemplary four-bar planar linkage systems. In the FIG. 15 embodiment, an exemplary four-bar planar linkage mechanism 1500 includes four rigid linkage arms 1505, 1510, 1515, 1520 and four vertices 1525, 1530, 1535, 1540 that each connect pairs of adjacent linkage arms. Each linkage arm (e.g. 1505) is rigid so as to maintain a fixed distance between the two vertices (e.g. 1525 and 1530) that each linkage arm with its two adjacent neighbors. A snowmobile tunnel may be represented by the linkage member 1505. A snowmobile slide rail may be represented by linkage member 1515. In this figure, the vertex 1525 is moved, either vertex 1525 or vertex 1540 must move in response. Assuming that vertices 1535 and 1540 are kept stationary so as to be a reference for movement, vertex 1530 must move in response to movement of vertex 1525. Thus, when vertex 1525 is displaced to position 1545 which is closer to a line 1555 containing the linkage arm 1515, the vertex 1530 must move to position 1550 which is also closer to the line 1555 containing the linkage arm 1535. Such movements may represent a compression of the first shock member which may supply support to vertex 1525 as part of a snowmobile suspension, when in a coupled mode. The second shock member which may supply support to vertex 1530 of a snowmobile suspension may need to compress/expand in response to compression/expansion of the first shock member. Line 1560 may represent an arc of dependent travel for vertex 1525.

Figure 16:
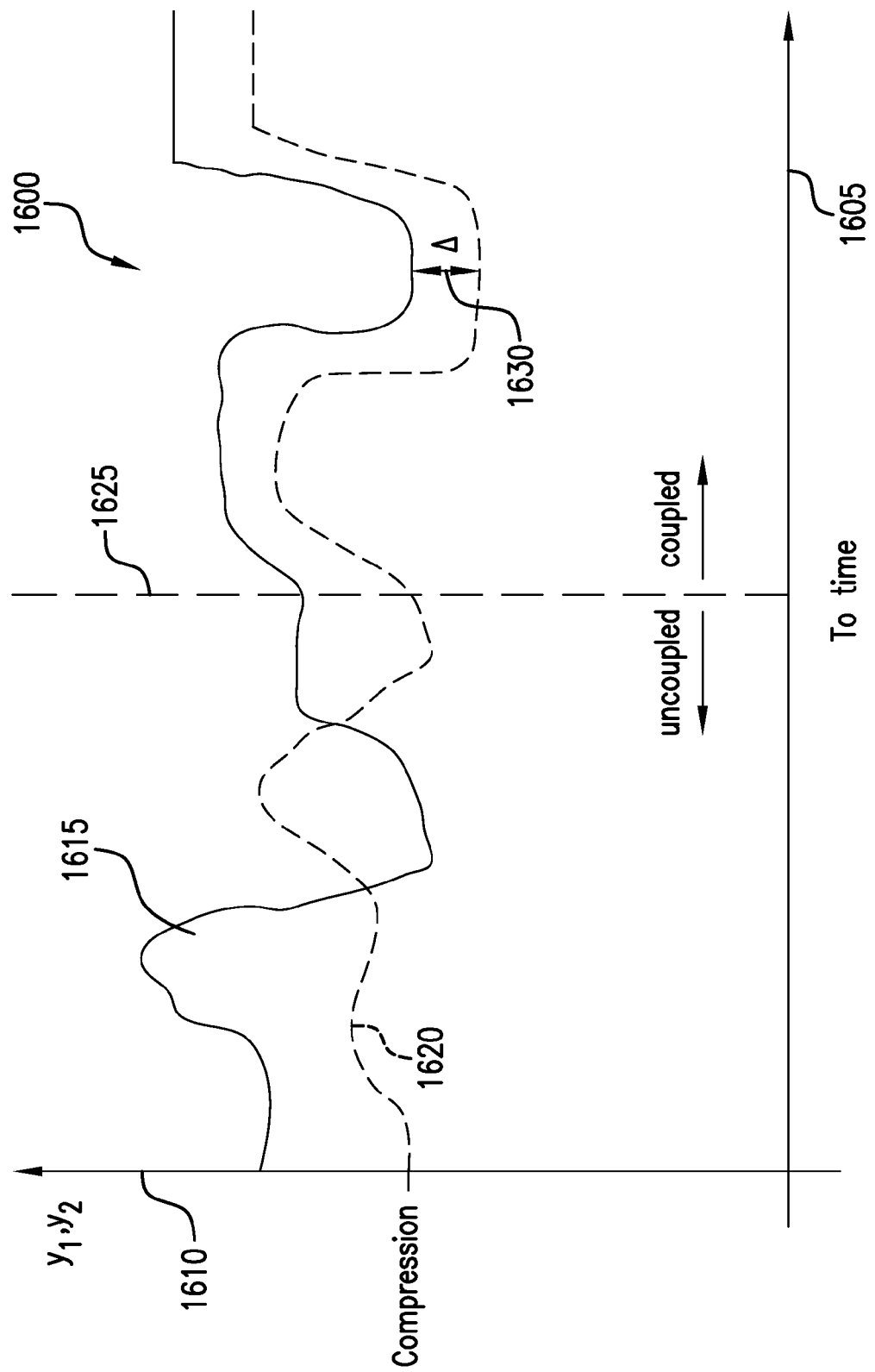
FIG. 16 depicts a graph of a compression of two shock members versus time for an exemplary riding scenario.

FIG. 16 depicts a graph of a compression of two shock members versus time for an exemplary riding scenario. In the depicted figure, a graph 1600 includes a horizontal axis 1605 that represent time and a vertical axis 1610 that represents a state of compression of a shock member. A first shock compression relation 1615 represents a state of compression of a first shock member during the course of an exemplary snowmobile ride. A second shock compression relation 1620 represents a state of compression of a second shock member during the course of the exemplary snowmobile ride. At the beginning of the ride (e.g. for times before $T_0$ marked by vertical line 1625), the snowmobile suspension may be in an uncoupled mode. When in the uncoupled mode, no apparent correlation exists between the first shock compression relation 1615 and the second shock compression relation 1620. For the later depicted times of the ride (e.g. for times after $T_0$ marked by vertical line 1625), the snowmobile suspension may be in a coupled mode. When in the coupled mode, the first shock compression relation 1615 appears correlated to the second shock compression relation 1620. When the coupled mode is invoked, the second shock is more compressed than the first shock as indicated by the separation, Δ 1630, in the exemplary embodiment.

The coupling may be invoked at any time, and this when the two suspension are at any specific state of compression. This compression independent coupling may advantageously permit a rider to invoke coupling at any time regardless of the current state of a snowmobile suspension. For example, the coupling may be invoked while the snowmobile is travelling at a high velocity. Or, if so desired by the rider, the coupling may be automatically invoked when specific conditions are realized. For example, the coupling may be automatically invoked when a weight transfer calculator calculates a weight transfer that exceeds a threshold. The threshold may be selected by the user, in some embodiments. In an exemplary embodiment, the threshold may be predetermined.

In some embodiments, the level of compression of a first shock (e.g. 1615) may be strongly correlated to the level of compression of a second shock (e.g. 1620), when in a coupled mode. The correlation may increase with increased coupling between the first and second shocks. In some embodiments, when strongly coupled, the correlation between the first shock and the second shock may be substantially proportional. For example, when the first shock member compresses a specific amount, the second shock member may compress a proportional amount in response to the compression of the first shock. In some embodiments, the inverse proportion of the first shock's compression in response to compression of the second shock may be approximately equal to a forward proportion of the second shock's compression in response to compression of the first shock. In an exemplary embodiment the inverse proportion may be approximately the reciprocal of the forward proportion. In some embodiments, when strongly coupled, a functional relation between a compression of one shock in response to a compression of another shock may result from the specific linkage arrangement of the particular suspension system. In some embodiments, even if weakly coupled only, the sign of the derivative of a compression/expansion of a first shock member with respect to time may have the same sign as the derivative of a compression/expansion of a second shock member with respect to time to which the first shock member's compression/expansion is in response.

Although various embodiments have been described with reference to the figures, other embodiments are possible. For example, in some embodiments, a rear suspension member may include a remotely adjustable coupling member. In some embodiments, a front suspension member may include a remotely adjustable coupling member. In various embodiments, the depicted tunnel connections and rail connections may be interposed. For example, in some embodiments, the tunnel may connect to one or more suspension members via slidable coupling member. In some embodiments, the remotely adjustable coupling member may couple to the tunnel of a snowmobile. Various mechanisms may enjoy the requisite degrees of freedom to permit uncoupled operation of one suspension member with respect to another suspension member. Various means of coupling two suspension members may be used. For example, remotely inhibiting one of the degrees of freedom of a suspension system may be used. In some examples, a pivot joint may be inhibited. In some examples, a piston may be inhibited. In an exemplary embodiment, a slidable connector may be inhibited. In some embodiments more than one degree of freedom may be inhibited.

In an exemplary embodiment, a snowmobile may be equipped with an air suspension system. Some exemplary suspension control systems may provide air to suspension members to increase the lift, for example, of a suspension member. The suspension controller may raise, for example a rear suspension member when a weight transfer calculator calculates a weight transfer to the rear suspension member. In an exemplary embodiment, a front air suspension member may be supplied air during a hard braking condition, for example. Such a hard braking event may be calculated using signals received from an accelerometer 835, for example.

In some embodiments the dynamic coupling may be changed by the rider moving a cable actuator. In various embodiments various coupling profiles may be stored in a computer device, and selected by the rider using buttons. In an exemplary embodiment, a hydraulic line may be actuated either directly by a user or via an electronic transducer. In some embodiments the dynamic coupling may be varied by an electric servo motor.

In various embodiments, apparatus and methods may involve a variable mechanical stop to some degree of freedom in the suspension mechanism. In some embodiments, the RASC may dynamically change a spring constant in a linkage member. In an exemplary embodiment, a dynamically adjustable shock may be used to change the resistance of a member of the suspension. In accordance with another embodiment, the angle of travel of a member may dynamically change to affect the amount of coupling.

In an exemplary embodiment, an attitude sensor on a snowmobile may detect the attitude of the vehicle and then be used by a computer to automatically invoke more or less coupling in the suspension. In accordance with another embodiment, the rider may program various coupling states that he/she finds useful, and then toggles between the states with a user interface.

In accordance with some embodiments, a single rear shock and a single center shock may be used. In accordance with an exemplary embodiment, two rear shocks may be used, one on either side of the suspension. In an exemplary embodiment, two front shocks may be used, one on either side of the suspension. In some embodiments two simultaneously controlled coupling members may be used, one on either side of the suspension. For example, two dynamically adjustable shocks may be used to provide the variable coupling of the RASC. In some embodiments, the two coupling members may be independently controlled, providing independent left-hand side and right-hand side dynamic coupling.

Various embodiments may provide RASC to different types of vehicles. In some embodiments RASC may be used on ATVs. In some embodiments, RASC may be used on snowmobiles. In various embodiments, RASC may be implemented for automobiles. RASC, for example, may be implemented using electronically coupled suspension members instead of mechanically coupled suspension members. In such electronically coupled embodiments, a force sensor located on one suspension member may be used to cause another suspension member to change its response or suspension behavior. In some embodiments, the sensor may detect compression in one suspension member. That detected compression may result in an electronic signal controlling an adjustable suspension member somewhere in the suspension system. In some embodiments, a number of sensors may be distributed throughout the suspension system. These signals may then be processed by a computer to determine how much coupling may be optimal and where such coupling should be applied.

In some embodiments, more than two discrete suspension members may be used. One of the suspension members may be remotely coupled to one or more of the other suspension members by inhibiting one or more degrees of freedom in the suspension system. In some embodiments, two or more suspension members may be coupleable to one or more other suspension members. In various embodiments, the rear suspension member may be coupled to the center suspension member by inhibiting a degree of freedom in the front suspension member.

In an exemplary embodiment a remotely adjustable shock may have more than one remotely adjustable parameter. For example, in some embodiments, a resistance to compression may be independently adjusted with respect to a resistance to expansion of a shock. In some embodiments, for example, a user may remotely adjust the resistance to compression to be relatively high. A first suspension member may be coupled to a second suspension member when a compressive force is presented to one of the suspension members. The user may, for example adjust the resistance to expansion to be relatively low. The first suspension member may be uncoupled to the second suspension member when an expansion force is presented to one of the suspension members. Other shock parameters may be remotely adjustable. In some embodiments one, two or more parameters may be independently remotely adjusted.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, device driver, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs and PLDs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g/n, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A five-member linkage snowmobile suspension system comprising:
    an elongate slide rail;
    a first torque arm pivotably connected at a first end to a second end of the elongate slide rail at a first vertex;
    a snowmobile tunnel pivotably connected at a first end to a second end of the first torque arm at a second vertex;
    a second torque arm pivotably connected at a first end to a second end of the snowmobile tunnel at a third vertex;
    a scissors member pivotably connected at a first end to a second end of the second torque arm at a fourth vertex, the scissors member pivotably connected at a second end to a first end of the elongate slide rail at a fifth vertex;
    a first shock member configured to provide spring support to the first second vertex from the slide rail;
    a second shock member configured to provide spring support to the third vertex from the slide rail; and,
    a Remotely Adjustable Shock Member (RASM) having a first end and a second end slideably coupled to each other so as to permit contraction and expansion of a separation distance between the two ends, the first end of the RASM connected to the elongate slide rail and the second end of the RASM connected to the scissors member, the RASM having a remotely selected coupled mode and a remotely selected uncoupled mode, wherein when the coupled mode is remotely selected, the RASM presents a high resistance to change in the separation distance, which substantially fixes the position of the scissors member relative to the elongate slide rail so that the scissors member and the elongate slide rail substantially behave as a single member thereby effectively reducing the five-member linkage snowmobile suspension system to a four-member linkage snowmobile suspension system, wherein when the uncoupled mode is remotely selected, the RASM presents a low resistance to change in the separation distance, which permits substantially free pivotable movement of the scissors member relative to the elongate slide rail.

2. The five-bar linkage snowmobile suspension system of claim 1, wherein the coupled mode and the uncoupled mode are remotely selected via a mechanical linkage.

3. The five-bar linkage snowmobile suspension system of claim 1, wherein the coupled mode and the uncoupled mode are remotely selected via an electric servo motor.

4. The five-bar linkage snowmobile suspension system of claim 1, further comprising a snowmobile.

5. The five-bar linkage snowmobile suspension system of claim 1, wherein the RASM is continuously adjustable between the coupled mode and the uncoupled mode.

6. The five-bar linkage snowmobile suspension system of claim 1, further comprising a coupling controller that generates signals indicative of a computed coupling mode.

7. The five-bar linkage snowmobile suspension system of claim 6, further comprising an attitude sensor that generates signals indicative of an attitude of a snowmobile, wherein the coupling controller receives the signals indicative of the attitude of the snowmobile, wherein the generated signals indicative of a computed coupling mode are generated based on the received signals indicative of the attitude of the snowmobile.

8. The five-bar linkage snowmobile suspension system of claim 6, further comprising a throttle position sensor that generates signals indicative of a position of a snowmobile throttle, wherein the coupling controller receives the signals indicative of the position of the snowmobile throttle, wherein the generated signals indicative of a computed coupling mode are generated based on the received signals indicative of the position of the snowmobile throttle.

9. A snowmobile-suspension adjustable coupling kit comprising:
   a Remotely Adjustable Shock Member (RASM) having a scissors end slideably coupled to a slide-rail end so as to permit contraction and expansion between the scissors end and the slide-rail end, the RASM having an adjustable damping coefficient that corresponds to a resistance to contraction or expansion between the scissors end and the slide-rail end;
   a scissors bracket configured to couple to both a scissors member and to the RASM;
   a slide-rail bracket configured to couple to both a slide rail and to the RASM; and,
   means for remotely adjusting the damping coefficient of the RASM,
   wherein when the RASM is coupled to the scissors member via the scissors bracket and to the slide rail via the slide-rail bracket, and when the damping coefficient is remotely adjusted to present a high resistance to change in compression or expansion of the RASM, the position of the scissors member relative to the slide rail becomes substantially fixed so that the scissors member and the slide rail substantially behave as a single member thereby effectively reducing a degree of freedom of the snowmobile suspension system so as to increase coupling of a first suspension member to a second suspension member,
   wherein when the RASM is coupled to the scissors member via the scissors bracket and to the slide rail via the slide-rail bracket, and when the damping coefficient is remotely adjusted to present a relatively low resistance to change in compression or expansion of the RASM, the scissors member can move relative to the slide rail thereby decreasing the coupling of the first suspension member to the second suspension member.

10. The snowmobile-suspension adjustable coupling kit of claim 9, wherein the means for remotely adjusting the damping coefficient of the RASM comprises a mechanical linkage.

11. The snowmobile-suspension adjustable coupling kit of claim 9, wherein the means for remotely adjusting the damping coefficient of the RASM comprises an electric servo motor.

12. The snowmobile-suspension adjustable coupling kit of claim 9, wherein adjustable damping coefficient is continuously adjustable between a maximum resistance to contraction or expansion and a minimum resistance to contraction or expansion.

13. A snowmobile suspension system comprising:
   a track assembly comprising a slide rail, a first suspension system, and a second suspension system, the first and second suspension systems each configured to compress and/or expand in response to forces resulting from snowmobile operation;
   a snowmobile tunnel pivotably connected to the first suspension system at a first pivot location and pivotably connected to the second suspension system at a second pivot location, the first pivot location being a fixed distance from the second pivot location, wherein when the first suspension system compresses and/or expands, the first pivot location moves relative to the slide rail along a one-dimensional path segment, wherein the second pivot location is moveable relative to the slide rail within a two-dimensional bounded region; and,
   a remote coupling member having a coupled mode and an uncoupled mode, wherein when in the coupled mode, a one-dimensional preferred path of movement that includes the second pivot location is established, the second pivot location is inhibited from moving in directions other than along the one-dimensional preferred path,
   wherein when no force is applied to the first suspension member and a force is applied to the second suspension member, when in the uncoupled mode, the first pivot location remains substantially unmoved and the second pivot location moves in response to the force along a path of isolation, the path of isolation being the path that substantially maintains the fixed distance between the unmoved first pivot location and the moving second pivot location, when in the coupled mode, the first pivot location moves substantially along the one-dimensional preferred path of movement, and the first pivot location moves in response to the movement of the second pivot location, the first pivot location moving along the one-dimensional path segment so as to maintain the fixed distance.

14. The snowmobile suspension system of claim 13, wherein the coupled mode and the uncoupled mode are remotely selected via a mechanical linkage.

15. The snowmobile suspension system of claim 13, wherein the coupled mode and the uncoupled mode are remotely selected via an electric servo motor.

16. The snowmobile suspension system of claim 13, further comprising a snowmobile.

17. The snowmobile suspension system of claim 13, wherein the RASM is continuously adjustable between the coupled mode and the uncoupled mode.

18. The snowmobile suspension system of claim 17, further comprising a coupling controller that generates signals indicative of a computed coupling mode.

19. The snowmobile suspension system of claim 17, further comprising an attitude sensor that generates signals indicative of an attitude of a snowmobile, wherein the coupling controller receives the signals indicative of the attitude of the snowmobile, wherein the generated signals indicative of a computed coupling mode are generated based on the received signals indicative of the attitude of the snowmobile.

20. The snowmobile suspension system of claim 17, further comprising an throttle position sensor that generates signals indicative of a position of a snowmobile throttle, wherein the coupling controller receives the signals indicative of the position of the snowmobile throttle, wherein the generated signals indicative of a computed coupling mode are generated based on the received signals indicative of the position of the snowmobile throttle.

* * * * *